United States Patent
Whitehouse et al.

(10) Patent No.: US 6,403,953 B2
(45) Date of Patent: *Jun. 11, 2002

(54) MULTIPOLE ION GUIDE FOR MASS SPECTROMETRY

(75) Inventors: Craig M. Whitehouse, Branford; Erol Gulcicek, Cheshire, both of CT (US)

(73) Assignee: Analytica of Branford, Inc., Branford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 09/727,285

(22) Filed: Nov. 30, 2000

Related U.S. Application Data

(63) Continuation of application No. 09/373,337, filed on Aug. 12, 1999, now Pat. No. 6,188,066, which is a continuation of application No. 08/794,970, filed on Feb. 5, 1997, now Pat. No. 5,962,851, which is a continuation of application No. 08/645,826, filed on May 14, 1996, now Pat. No. 5,652,427, which is a continuation of application No. 08/202,505, filed on Feb. 28, 1994, now abandoned.

(51) Int. Cl.$^7$ ............................ B01D 59/44; H01J 49/00
(52) U.S. Cl. ........................... 250/288; 250/281
(58) Field of Search ................. 250/288, 281, 250/289, 298

(56) References Cited

U.S. PATENT DOCUMENTS

| | | | | |
|---|---|---|---|---|
| 4,963,736 A | * | 10/1990 | Douglas et al. | 250/292 |
| 5,179,278 A | * | 1/1993 | Douglas | 250/290 |
| 5,652,427 A | * | 7/1997 | Whitehouse | 250/288 |
| 5,962,851 A | * | 10/1999 | Whitehouse | 250/288 |
| 6,188,066 B1 | * | 2/2001 | Whitehouse | 250/288 |

\* cited by examiner

*Primary Examiner*—Bruce Anderson
(74) *Attorney, Agent, or Firm*—Levisohn, Lerner, Berger & Langsam, LLP

(57) ABSTRACT

A multipole ion guide which begins in one pumping stage and extends continuously into one or more subsequent pumping stages has been incorporated into an atmospheric pressure ion source mass spectrometer system. Ions delivered into vacuum from an Electrospray, Atmospheric Pressure Chemical Ionization or Inductively Coupled Plasma ion source are guided and focused into a mass analyzer with high efficiency using the multipole ion guide. The background pressure over a portion of the multipole ion guide length is high enough to cause kinetic energy cooling of ions traversing the ion guide length due to ion collisions with neutral background gas molecules. This ion kinetic energy cooling lowers energy spread of ions traversing the multipole ion guide length. The multipole ion guide DC offset potential can be used to adjust the mean ion energy and the ion guide $a_n$ and $q_n$ values can be set to reduce or expand the range of ion mass to charge which will be transmitted through the ion guide. These features of multipole ion guides and multiple pumping stage multipole ion guides are used to improve performance and lower the cost of Atmospheric Pressure Ion source mass spectrometer instruments.

20 Claims, 14 Drawing Sheets

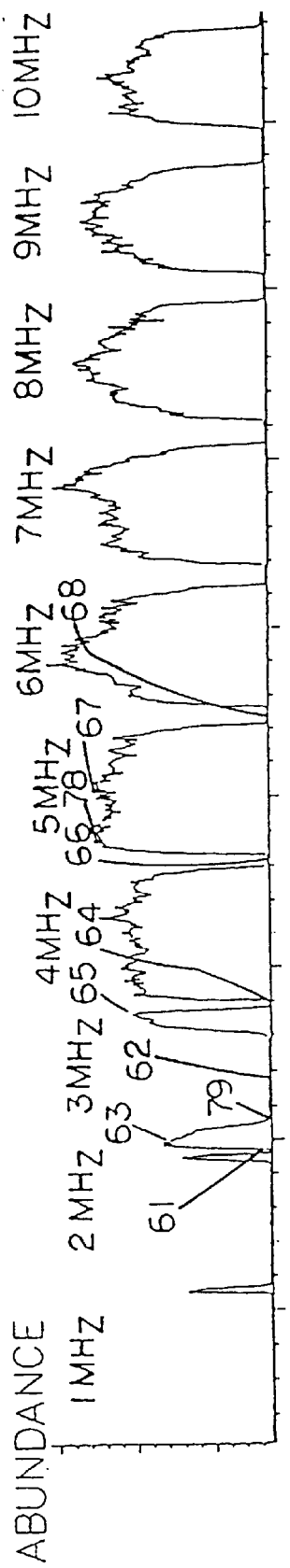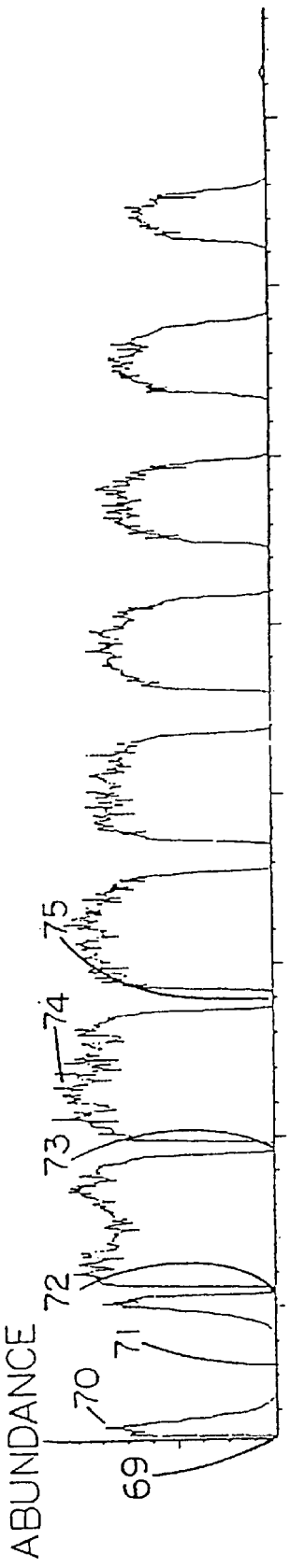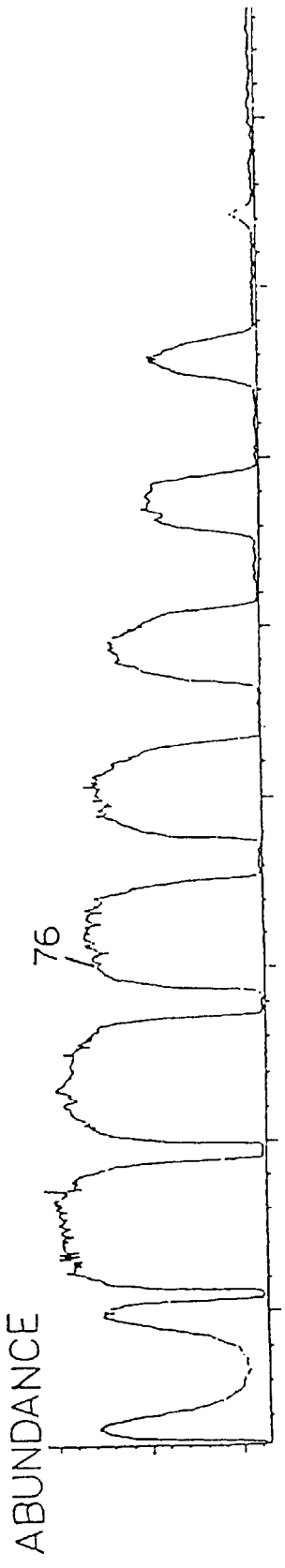

MULTIPOLE ION GUIDE FOR MASS SPECTROMETRY

RELATED APPLICATIONS

The present application is a continuation of U.S. Nonprovisional patent application Ser. No. 09/373,337 filed Aug. 12, 1999 now U.S. Pat. No. 6,188,066 which is a continuation of U.S. Nonprovisional patent application Ser. No. 08/794,970 filed Feb. 5, 1997 (patented as U.S. Pat. No. 5,962,851 issued on Oct. 5, 1999), which is a continuation of U.S. Nonprovisional patent application Ser. No. 08/645, 826 filed May 14, 1996 (patented as U.S. Pat. No. 5,652,427 issued on Jul. 29, 1997), which is a continuation of U.S. Nonprovisional patent applicaition Ser. No. 08/202,505 filed Feb. 28, 1994 (abandoned). This application claims all rights of priority to those prior applications, and all of those prior applications are fully incorporated herein by reference.

FIELD OF INVENTION

This invention relates to the configuration and method of using a multipole ion guide to transport and focus ions which enter vacuum from an atmospheric pressure ion source, into a mass analyzer. The multipole on guide which begins in one vacuum pumping stage has been configured to extend contiguously through one or more subsequent vacuum stages. Multipole ion guides are used to efficiently transfer ions through one or more vacuum stages while allowing the neutral background gas to be pumped away. The AC frequency and AC and DC voltages which are applied to the poles of a multipole ion guide can be set so that the multipole ion guide will pass a selected range of ion mass to charge. The ion transmission properties of multipole ion guides can be used to enhance performance of specific mass analyzer types which are interfaced to atmospheric pressure ion sources.

BACKGROUND OF THE INVENTION

Atmospheric pressure ion sources (API) have become increasingly important as a means for generating ions used in mass analysis. Electrospray or nebulization assisted Electrospray (ES), Atmospheric Pressure Chemical Ionization (APCI) and Inductively Coupled Plasma (ICP) ion sources produce ions from analyte species in a region which is approximately at atmospheric pressure. The ions must then be transported into vacuum for mass analysis. A portion of the ions created in the API source are entrained in the bath gas API source chamber and are swept into vacuum along with a the bath or carrier gas through an orifice into vacuum. Mass spectrometers (MS) generally operate in a vacuum maintained at between $10^{-4}$ to $10^{-10}$ torr depending on the mass analyzer type. The gas phase ions entering vacuum from an API source must be separated from the background carrier gas and transported and focused through a single or multiple staged vacuum system into the mass analyzer. Variations in vacuum system and associated electrostatic lens configurations have emerged in API/MS systems. Where multiple pumping stages have been employed, the electrostatic lens elements have been configured to serve as restricted orifices between vacuum stages as well as providing ion acceleration and focusing of ion into the mass analyzer. Performance tradeoffs may occur where electrostatic lenses must also accommodate restricting the neutral gas transmission from one pumping stage to the next. For example, a skimmer placed between one pumping stage and the next may restrict the neutral gas flow but may also restrict the passage of ions as well due to its relatively small orifice. Two types of Electrostatic elements have been used to transport and focus ions in vacuum, particularly where ions are entering vacuum from atmospheric pressure through a free jet expansion. The first is a static voltage lens and the second is a dynamic field ion guide. The most effective lens configurations used in API/MS systems employ a judicious combination of both elements which have static and dynamic fields applied.

The first electrostatic lens type has a fixed or static DC voltage applied during the time an ion is traversing the lenses' field. FIG. 1 is a diagrammatic representation of a four pumping stage API/MS system with static voltage electrostatic lenses. Gas emerging from the capillary exit 8 into vacuum expands as a supersonic free jet and a portion of the gas passes through the first 10 and second 14 skimmer. Skimmers between pumping stages typically have small orifices to restrict the neutral gas flow into each downstream vacuum stage. DC voltages are applied to the capillary exit, skimmers and other electrostatic lenses 9, 14, 15, 16 and 17 with values set to maximize the ion transmission into the mass spectrometer. Ions entrained in the expanding gas follow trajectories that are driven by a combination of electrostatic and gas dynamic forces. Strong influence from the gas dynamics can extend up to and beyond the second skimmer 13 for the configuration shown in Figure one. The efficiency of ion transmission through a static voltage lens set can be reduced by scattering losses due to collisions between ions and the background gas which occur along the ion trajectory. Ions with different m/z may vary their collisional cross sections and hence experience different numbers of background collisions as they are transported through vacuum. For a given electrostatic lens voltage setting the efficiency of ion transport into the mass spectrometer may vary with m/z or the collisional cross section. Changing the lens voltage values may optimize transmission for a given ion species but the setting may not be optimal for another ion species transmission. For example static lens configurations used in API/MS applications may not transmit lower molecular mass compounds as efficiently as higher molecular mass compounds. The smaller ions may sustain higher transmission losses due to collisional scattering from the background gas than the higher molecular mass compounds. To increase ion transmission efficiency through a static lens stack, the electrostatic energy must be set sufficiently high so that ions can be driven through the background gas. Static voltage lens configurations also tend to focus ions of different energy at different focal points. If the focal point is not located at the mass spectrometer entrance transmission losses can occur. To overcome the mass to charge transmission discrimination effects and ion transport inefficiencies which occur when static voltage lenses are used, multipole dynamic field ion guides have been employed to transport ions through vacuum pumping stages in the vacuum region of API/MS systems. The dynamic electrostatic fields within a multipole ion guide dominate over the background gas scattering collisions and effectively "trap" the ions while they traverse the length of the multipole ion guide.

The use of multipole ion guides has been shown to be an effective means of transporting ions through vacuum. Publications by Olivers et. al. (Anal. Chem, Vol. 59, p. 1230–1232, 1987), Smith et. al. (Anal. Chem. Vol. 60, p.436–441, 1988) and U.S. Pat. No. 4,963,736 (1990) have reported the use of a quadrupole ion guide operated in the AC-only mode to transport ions from an API source into a quadrupole mass analyzer. U.S. Pat. No. 4,963,736 describes the use of a multipole ion guide in either vacuum pumping stage two of a three stage system or in the first pumping stage of a two stage vacuum system. This patent also reports that increasing the background pressure up to 10 millitorr in the vacuum stage where the ion guide was positioned resulted in an increase in ion transmission efficiency and a decrease in ion energy spread of ions transmitted. Ion signal intensity decreased for higher background pressures in the reported quadrupole configuration. A commercially available API/MS instrument manufactured by Sciex, a Canadian company, incorporates a quadrupole ion guide operated in the AC-only mode located before the quadruple mass filter in a single stage vacuum system. Ions and neutral gas flowing into vacuum through an orifice in the API source enter the quadrupole AC-only ion guide. The ions are trapped from expanding in the radial direction by the AC quadrupole fields and are transmitted along the quadrupole ion guide rod length as the neutral gas is pumped away through the rod spacing. Ions exiting the quadrupole ion guide are focused into a quadrupole mass filter located in the same vacuum chamber. Neutral gas is pumped away by a high capacity and relatively expensive cyro pump. Multiple quadrupole ion guides have been used to transport ions from API sources through multiple vacuum pumping stages and into a Fourier-Transform Ion Cyclotron Resonance mass analyzer. Beu et. al. (J. Am. Soc. Mass Spectrom vol. 4. 546–556, 1993) have reported using three quadrupole ion guides operated in the AC-only mode located in three consecutive vacuum pumping stages of a five pumping stage Electrospray Fourier-Transform Ion Cyclotron Resonance (FT-ICR) mass spectrometer instrument. The multiple pumping stages are required to achieve operating pressures in the mass analyzer of less than $2 \times 10^{-9}$ torr. Orifices mounted in the partitions between each vacuum pumping stage which restricted neutral gas conductance from one pumping stage to the next were located between consecutive quadrupole ion guides.

Over the past few years as API/MS system design has evolved, higher performance with lower system cost has been achieved by using multiple vacuum stages to remove the background gas from the ions which enter from atmospheric pressure into vacuum. The type of mass analyzer to which an API source is interfaced places its unique demands on the ion transport lens configurations and vacuum requirements in the ion transport region between atmospheric pressure and the mass analyzer. Each mass analyzer type has an acceptable ion energy, ion energy spread and entrance angular divergence which the upstream ion transport lens system must satisfy when delivering ions to the entrance of a mass spectrometer. For example, a quadrupole mass analyzer can accept ions with axial translational energy generally below 40 electron volts whereas a magnetic sector mass spectrometer requires ions with thousands of volts of axial translational energy.

In the present invention, a multipole ion guide is configured to increase the overall sensitivity of an API/MS system while reducing instrument cost and complexity. In one embodiment of the present invention, a multipole ion guide is used to transport ions entering vacuum from an API source to non-dispersion type mass analyzers. A range of ion mass to charge (m/z) can be efficiently transmitted through a multipole ion guide provided the ion guide operating stability region is set to pass those values of m/z. If an ion with a given mass to charge ratio falls within the operating stability region set for a multipole ion guide, the ion will be effectively trapped from drifting to far in the off axis direction but is free to move in the direction of ion guide axis. If the ion m/z falls outside the stability region, it will not have a stable trajectory and will be rejected from the ion guide before it reaches the exit end. Collisions between an ion and the background gas within the multipole assembly can also effect the ion trajectory and the ion kinetic energy as it passes through the multipole ion guide. The background gas, if present at high enough pressure, may serve, through collisions, to damp the motion of ions as they pass through the multipole ion guide, cooling their kinetic and thermal energy. This aids in forming an ion beam which exits the multipole ion guide with reduced energy spread for a given ion species within the beam. The range of m/z which are transmitted through a multipole ion guide for a given background pressure environment can be varied by adjusting the AC frequency and AC and/or a DC voltage which can be applied with alternate polarity to each adjacent rod. The offset potential of the multipole lens, that is the DC voltage applied uniformly to all the rods on which the AC and alternate polarity DC rod potentials are floated and referenced is one variable that can to be used to set the energy of ions transmitted through the multipole ion guide. Multipole ion guides can be configured to efficiently transport ions through a wide range of vacuum pressures. The ability of a multipole ion guide to deliver and ion beam with low energy spread and where the mean energy and m/z range can be adjusted into a mass analyzer can be used to improve the performance of an API/Time-Of-Flight, API/Ion Trap and API/FT-ICR mass spectrometer systems.

Another embodiment of the invention is the incorporation of a multiple vacuum pumping stage multipole ion guide into an API/MS system. A multiple vacuum pumping stage multipole ion guide is a multipole ion guide which begins in one pumping stage and extends contiguously through one or more additional vacuum pumping stages of a multiple pumping stage system. Multipole ion guides which are located in only one vacuum pumping stage of a multiple pumping stage system must deliver the ions exiting the ion guide into an aperture with static voltage applied. If background pressure is high enough to scatter the ions after the multipole ion guide exit or the aperture to the next pumping stage has a smaller diameter than the ion beam cross section, losses in ion transmission can occur. If individual multipole ion guides are located progressively in the first few pumping stages of an API/MS system, ion transmission losses can occur when transferring ions between pumping stages. If fewer pumping stages are used to reduce the ion transmission losses between pumping stages, the total gas flow and hence the total number of ions which can be delivered to vacuum may be compromised. Over 95% ion transmission efficiency can be achieved through multiple vacuum pumping stages using multipole ion guides configured to extend contiguously through two or more vacuum pumping stages. A multiple vacuum stage multipole ion guide must be configured serve as an ion guide with an internal open area small enough to minimize the neutral gas flow from one pumping stage to the next. Xu at. el. (Nuclear Instr. and Methods in Physics Research, Vol. 333, p. 274, 1993) have developed a hexapole lens which extends through two vacuum pumping stages to transport ions formed in a helium discharge source operated in a chamber maintained at 75 to 150 torr of pressure through two vacuum pumping stages into a faraday cup detector. The discharge ion source delivered ions into a two stage vacuum system through an orifice in the end wall of the source chamber. The background pressure in the first vacuum pumping stage was 600 millitorr and the second vacuum stage background pressure was 98 millitorr. Ion transmission efficiencies through the hexapole ion guide beginning in vacuum stage one and extending unbroken into vacuum stage two approached 90% for $O_2^+$.

The helium discharge ion source background pressure in this apparatus was 5 to 10 times below atmospheric pressure and helium was used as the background gas. Different configuration and performance criteria exist for multiple pumping stage multipole ions guides incorporated into an API/MS system than were required for the ion guide application described by Xu and coworkers. Multipole ion guides incorporated into API/MS systems must have the capability of efficiently transmitting ions of various charge states over a wide range of mass to charge. Nitrogen, not helium, is typically used as carrier gas in API sources and the background pressures in API/MS multiple vacuum stage systems are often widely different from the pressures reported in the ion guide apparatus reported by Xu. An added constraint imposed on API/MS systems which was not present in the non API/MS application practiced by Wu et. al. is the ability to fragment molecular ions by Collisional Induced Dissociation (CID) in the gas expansion region in the first two vacuum stages. Valuable structural information can be obtained from CID of molecular ions produced in ES and APCI sources. CID conditions can be set by adjusting relative potentials between static voltage lenses and even the DC offset potentials of multipole ion guides located in the first two vacuum pumping stages of a API source.

In the present invention, multiple pumping stage multipole ion guides are configured to maximize performance of API/MS systems while reducing system vacuum pump cost. Increasing signal sensitivity while lowering vacuum pumping cost is achieved by maximizing the ion transfer efficiency from the API source into the mass analyzer while minimizing the amount of neutral gas transferred. For the multiple pumping stage multipole ion guides which begin in one vacuum pumping stage and extend through one or more subsequent pumping stages, the rod diameter and rod spacing in the multipole ion guide assembly were configured small enough to minimize the transmission of neutral gas through the ion guide into downstream pumping stages. Acceptable vacuum pressure per pumping stage was be achieved with moderate capacity vacuum pumps. The ion guide with a small inner diameter was configured to allow sufficient conduction of neutral gas through the spaces between the rods or poles so the neutral gas was pumped away efficiently in each pumping stage. The small multipole ion guide inner diameter produced an ion beam with a proportionally small cross section. The smaller cross section ion beam focused into the mass analyzer allowed the reduction of the mass analyzer entrance aperture without compromising ion transmission efficiency. Efficient ion transport, better control of ion energy and energy spread and a small beam diameter is achieved by using a multiple vacuum pumping stage multipole ion guide.

SUMMARY OF THE INVENTION

In accordance with the present invention, an Atmospheric Pressure Ion source which includes Electrospray or nebulization assisted Electrospray, Atmospheric Pressure Chemical Ionization and Inductively Coupled Plasma ion sources interfaced to a mass analyzer incorporates a multipole ion guide in the vacuum pumping region between the API source and the mass analyzer.

In one embodiment of the invention, the API/MS system includes multiple vacuum pumping stages and a multipole ion guide which begins in one vacuum pumping stage and extends contiguously through two or more vacuum pumping stages. The multipole ion guide inner diameter is reduced to minimize the neutral gas conduction between vacuum pumping stages while allowing the efficient transport of ions through the multipole ion guide length. At least one portion of a multiple vacuum stage multipole ion guide is subject to background gas pressures which are high enough that the ions traversing the ion guide length are subject to many collisions with neutral background gas molecules. Ion transmission efficiencies through such multipole ion guide assemblies can exceed 95% even with background pressures in a given vacuum pumping stage of hundreds of millitorr. Collisions between the ions and the background neutral was in the multipole ion guide cause cooling of the ion kinetic energy, reducing the ion energy spread. The AC field of the multipole ion guide traps ions within a radial cross section and prevents scattering losses of the ions undergoing collisions with the background gas as the ions traverse the ion guide length. The energy of the ions exiting the multipole ion guide relative to the mass analyzer entrance aperture potential can be set by varying the multipole ion guide DC offset potential. With sufficient ion kinetic energy cooling in the ion guide, ion energy can be adjusted over a wide range with little change to the ion energy spread for a given m/z. Ions with mean energies of a few electron volts or lower can be transmitted into the mass analyzer entrance aperture by using multiple vacuum pumping stage multipole ion guides. Lower energy ions with a narrow energy spread transmitted into quadrupole mass analyzers will result in higher sensitivity for a given resolution than can be achieved with higher energy ions. Increased sensitivity and resolution can be achieved by using multiple vacuum pumping stage multipole ion guides with reduced vacuum system costs for quadrupole, time-of-flight, ion trap, FT-ICR and magnetic sector mass spectrometers.

When operating multipole ion guides in the AC only mode or with AC and DC applied to the poles, the frequency and voltage levels can be set so that a broad range of m/z ions will be transmitted through the multipole ion guide. The AC frequency and AC and DC voltages can also be set to restrict the range of m/z values that will be transmitted through the multipole ion guide for a given background pressure environment. Narrowing the range of m/z values transmitted to the analyzer of a TOF mass spectrometer can be used to increase the duty cycle and hence sensitivity of an API/TOF mass spectrometer instrument. Limiting the range of m/z for ions transmitted into an ion trap or the analyzer cell of an FT-ICR mass spectrometer instrument can reduce the effects of space charging in the trap or FT-ICR cell during mass analysis. This can improve the mass measurement accuracy, resolution and dynamic range of the mass analyzer.

DESCRIPTION OF THE DRAWINGS

FIG. 3a shows the transmission efficiency of ions through a two vacuum stage multipole ion guide for m/z 110 over a range of values for $q_n$.

FIG. 3b shows the transmission efficiency of ions through a two vacuum stage multipole ion guide for m/z 872 over a range of values for $q_n$.

FIG. 3c shows the transmission efficiency of ions through a two vacuum stage multipole ion guide for m/z 1743 over a range of values for $q_n$.

DESCRIPTION OF THE INVENTION

Figure 1:
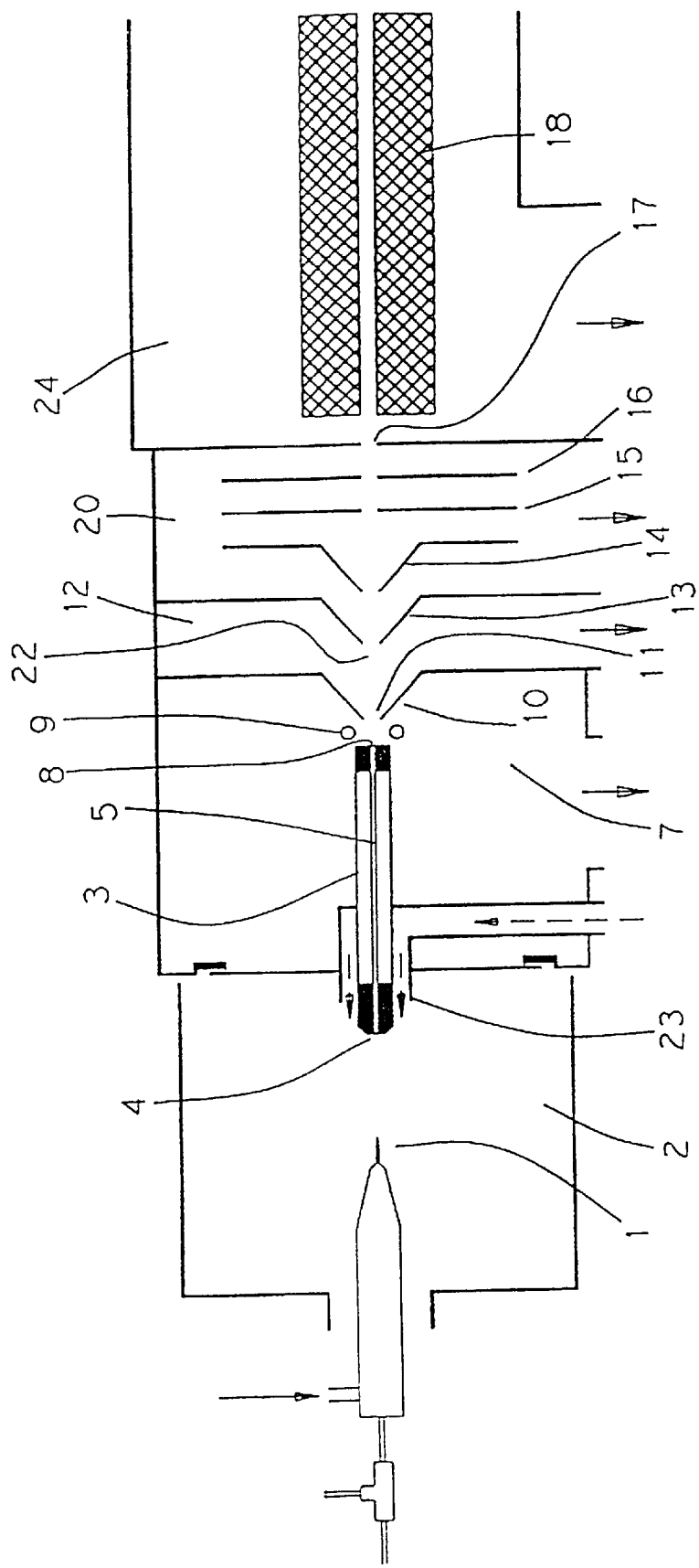
FIG. 1 is a diagram of a four vacuum stage ES/MS quadrupole instrument with a static lens configuration incorporated into vacuum stages 1 through 3.

Sample bearing liquid is introduced into atmospheric pressure ionization sources including ES, APCI and ICP sources and gas phase ions are produced from the analyte in solution. API/MS systems are available which include from one to over five vacuum pumping stages. An Electrospray ion source interfaced to a quadrupole mass spectrometer is diagrammed in FIG. 1. The system shown includes four vacuum pumping stages and a static voltage lens configuration to transfer ions through the first three pumping stages and focus them into the entrance of quadrupole mass spectrometer 18. In the configuration shown, sample bearing liquid is introduced through needle 1 and is Electrosprayed into the bath gas in chamber 2. Liquid droplets evaporate in chamber 2 or as they are swept into vacuum through capillary 3 and ions are released from the evaporating droplets. The charged liquid droplets can be dried by using a countercurrent drying gas 23 and/or a heated capillary 3. A portion of the ions and charged droplets formed in electrospray chamber 2 enter the capillary entrance 4 along with a portion of the background bath gas and are swept into vacuum through the capillary annulus 5. Alternatively the capillary orifice into vacuum could be replaced by a nozzle with appropriate orifice size. The bath or carrier gas and entrained ions are swept through the capillary and enter the first vacuum stage 7 after passing through the capillary exit 8. The pressure in vacuum stage 7 is generally maintained between 0.4 and 20 torr so the gas exiting the capillary expands in a supersonic free jet. The ions entrained in this free jet are accelerated by collisions with the expanding background gas. The background gas used is usually nitrogen but may be also be carbon dioxide, oxygen, helium or any number of other gases which suit the analysis requirements and ion source type. An electrostatic field is applied between the capillary exit 8, the ring lens 9 and the first skimmer 10 to electrostatically focus and accelerate ions through the skimmer 10 orifice 11 and on into the second vacuum stage 12. Vacuum stage 12 is typically operated at a pressure ranging from 5 to 200 millitorr depending on pumping speeds and the size of skimmer orifice 11. Electrostatic potentials are maintained between skimmers 10 and 13 and a portion of the ions passing through skimmer 10 are focused through orifice 22 in skimmer 13 into the third vacuum pumping stage 20. Pressure in pumping stage 20 is maintained typically between $1 \times 10^{-3}$ to below $8 \times 10^{-5}$ torr. Potentials are set on electrostatic lens elements 14, 15 and 16 to focus ions through aperture 17 after which they pass into the quadrupole mass filter 18 located in the fourth pumping stage 24.

The static voltage lens system shown in FIG. 1 transmits and focuses ions through the vacuum stages and into the mass analyzer while allowing the background gas to be pumped away. The ion energy relative to the quadrupole mass filter offset voltage is established by a combination of acceleration energy imparted by the expanding carrier gas and the electrostatic potentials applied. The capillary exit 8 potential relative to the ring electrode 9 and skimmer electrode 10 can be set high enough to cause Collisional Induced Dissociation (CID) which can affect the energy and energy spread of the parent and fragment ions. Ion transmission losses can occur in each pumping stage due to scattering from background pressure and the inability to electrostatically focus ions through the pumping stage skimmer orifices 11 and 22 and the quadrupole entrance aperture 17. To achieve the desired pressures per pumping stage while constraining the vacuum pumping speeds to fall below 800 L/sec to reduce the vacuum pump cost and size, skimmer orifice 11 in this configuration would typically have a diameter of 0.8 to 1.5 mm and skimmer orifice 22 may range from 0.8 to 3.0 mm. The smaller the skimmer orifice size the fewer the number of ions that can be transmitted through this static lens configuration. The higher the energy spread for ions of a given m/z and the larger the energy difference for ions with different m/z, the fewer the ions that can be efficiently focused into the mass spectrometer and effectively mass analyzed. Depending on vacuum pressures maintained during operation, the static lens configuration shown may exhibit different transmission efficiencies for different m/z values. Also, with static voltage lens systems, ion transmission efficiency drops off rapidly as the ion energy is reduced below 10 electron volts.

Figure 2:
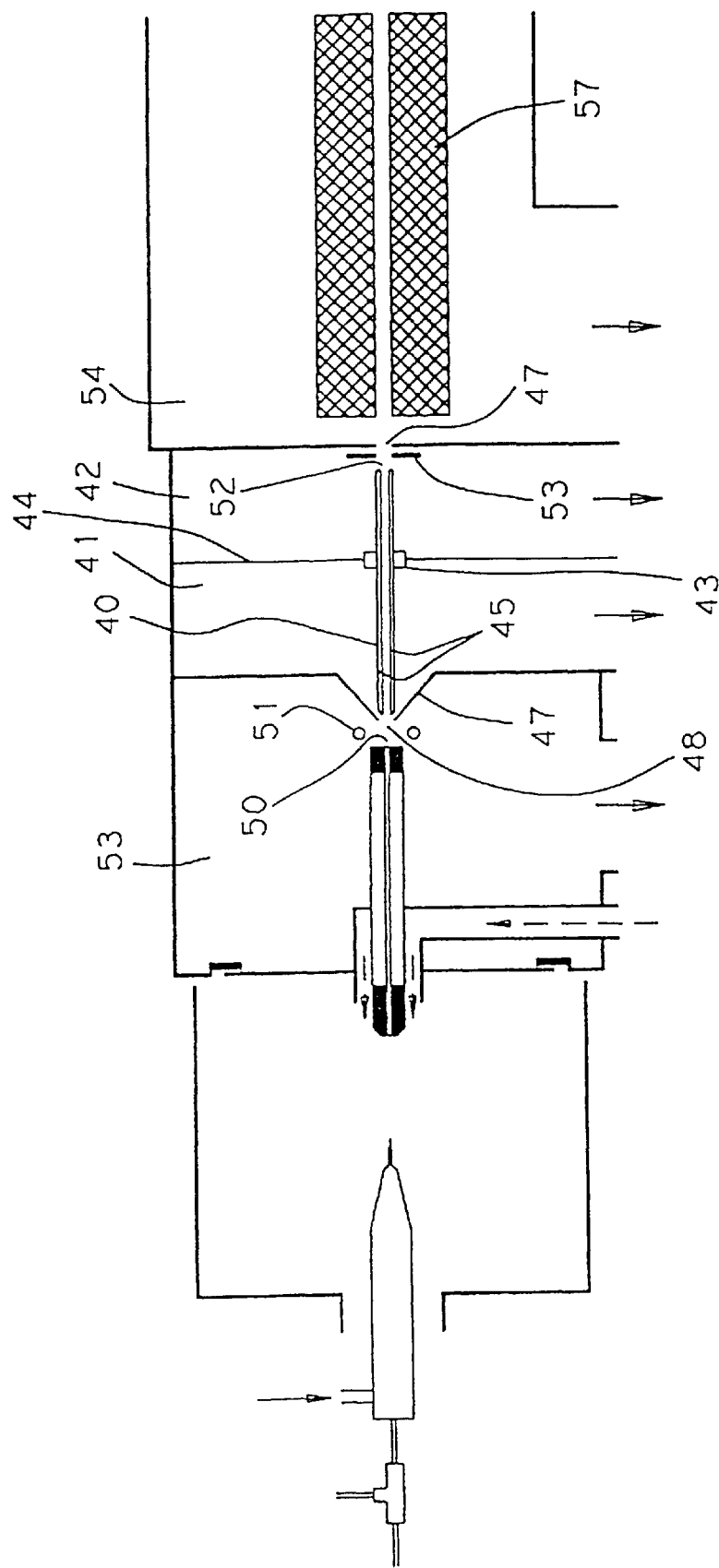
FIG. 2 is a diagram of a four vacuum stage ES/MS quadrupole instrument with a multipole ion guide beginning in the second vacuum pumping stage and extending contiguously into the third pumping stage.
Figure 12:
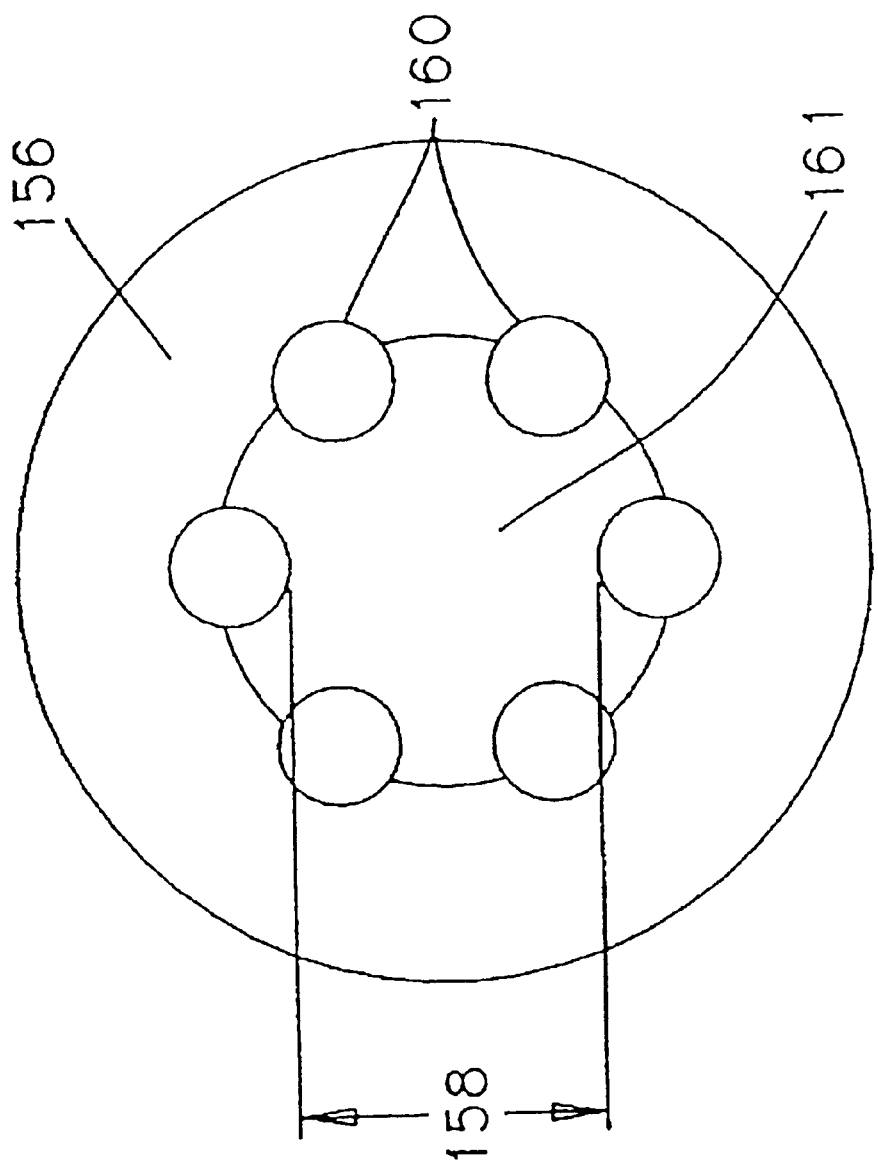
FIG. 12 is a cross section of a hexapole ion guide including the electrically insulating mounting bracket.

To improve ion transmission performance yet retain the advantages of multiple pumping stages to more cost effectively remove neutral gas, a multipole ion guide has been used, replacing some of the static voltage lenses. FIG. 2 illustrates a multipole lens assembly 40 which begins in vacuum pumping stage 41 and extends unbroken into vacuum pumping stage 42. Individual rods or poles 45 in assembly 40 are held in place and electrically isolated from the partition between vacuum pumping stage 41 and 42 by insulator 43. A cross section of a hexapole ion guide is illustrated in FIG. 12 with insulator 156 serving the dual purpose of holding the six rods or poles 160 in position while minimizing the effective aperture area inside the rods assembly diameter through which neutral gas flows and ions are transmitted from one pumping stage to the next. Multipole ion guide assembly 40 consists of parallel electrodes 45 in FIG. 12 shown as round rods 160 equally spaced with a common radius from the centerline. An octapole ion guide would have eight equally spaced rods and a quadrupole would have four equally spaced rods or poles. When multipole ion guide 40 is operated in the AC-only mode, every other rod has the same AC frequency, voltage and phase and every adjacent rod has the same AC frequency and voltage applied but a phase difference of 180 degrees. So for a hexapole ion guide, three rods or poles would be operated with the same AC frequency, voltage and phase and the same AC frequency and voltage with a phase difference of 180 degrees would be applied to the remaining three rods. A DC offset voltage is applied to all rods 45 of the multipole ion guide 40 and plays a large role in establishing the ion energy. The multipole ion guide DC offset potential is set to focus ions passing through skimmer 47 orifice 48 into the multipole ion guide. The kinetic energy of the ions entering multipole ion guide 40 has contributions from the velocity imparted by the expanding gas exiting capillary exit 50, the relative electrostatic DC potentials applied to capillary exit 50, ring lens 51, skimmer 47 and the multipole rod 40 DC offset potential as well as any AC voltage component from fringing fields as ions enter multipole ion guide 40. Static voltage lens elements may be added at the exit end 52 of the multipole ion guide to focus ions into the mass analyzer entrance 47. Lens 53 is positioned at exit 52 of multipole ion guide 40 to shield the exiting ions from the multipole AC voltage fringing fields and to focus the ions into the mass analyzer entrance aperture 47. The efficiency of ion transport through this two pumping stage multipole ion guide 40 is over 95% for a wide range of ion m/z values. Ion transmission efficiencies were determined by measuring the total ion current which passed through skimmer orifice 48 and by measuring the total ion current exiting multipole ion guide 40 for the same electrospray ion source operating conditions.

The performance characteristics of the two vacuum pumping stage multipole ion guide 40 diagrammed in FIG. 2 will be used as an example although many variations in multiple pumping stage multipole ion guides are possible. A hexapole ion guide was configured with rods beginning in vacuum pumping stage 41 and extending contiguously into vacuum pumping stage 42 of a four stage system as diagrammed in FIG. 2. For testing purposes, the background pressures could be varied in the first and second pumping stages 53 and 41. With multipole ion guide 40 operated in the AC-only mode, the AC frequency and amplitude and the DC offset potentials were varied to map out performance over a range of background pressures.

A two vacuum stage hexapole ion guide was chosen over a quadrupole or octapole because for this four vacuum stage API/MS system because the hexapole configuration was the most favorable compromise between trapping efficiency, vacuum pumping conduction through the rod spacing and overlap of stability regions for a wide range of m/z values and background pressures. Two non-dimensional coefficients $a_n$ and $q_n$ are commonly used when mapping ion trajectories in multipole ion guides or mass filters by solving the Laplace equation of motion. The two coefficients are defined as:

$$a_n = \frac{n^3 U}{2\left(\frac{m}{z}\right)\omega^2 r_O^2} \quad \text{and} \quad q_n = \frac{n^3 V}{4\left(\frac{m}{z}\right)\omega^2 r_O^2}$$

where n is the number of rod pairs (n=3 for a hexapole), U is the DC potential applied to the rods, every other rod having opposite polarity, m/z is the mass to charge ratio of the ion traversing the multipole ion guide, ω is the frequency applied, V is the zero-to-peak AC potential applied to the rods, every other rod being 180 degrees out of phase, and $r_0$ is the radius from the assembly centerline. When the multipole ion guide is operated in the AC-only mode, U is set equal to zero so $a_n$ drops out of the equation of motion. The DC rod offset potential applied equally to all rods only effects the ion trajectories entering and leaving the multipole ion guide 40. The offset potential should not effect the stability of the ion trajectories once the ions pass into the ion guide and are trapped within the rods other than to influence their initial entrance trajectory. For the configuration shown in FIG. 2, the background gas pressure inside the rod assembly varies along the multipole ion guide length and will effect the ion trajectories through the ion guide. To theoretically model the effect of the background neutral gas collisions on the ion trajectory through a multipole ion guide, the cross section of the ions must be known. The collisional cross sections of ions generated by API sources are not always known, however. In particular, the cross section of multiply charged ions which can be produced in the electrospray ion source are not always known. Consequently, for a given multipole ion guide configuration, values of $a_n$ and $q_n$ where efficient ion transmission through the multipole lens can be achieved must be mapped for any given m/z and background pressure combination encountered.

The rod AC voltages were ramped for different radio frequency (RF) values using the multipole ion guide configuration diagrammed in FIG. 2, to map the regions of stable $q_n$ for all m/z falling within the range of the quadrupole mass spectrometer. The background pressure gradient was held constant for each set of ion transmission tests to establish the values of $q_n$ where stable and efficient ion trajectories through the two vacuum stage multipole ion guide 40 could be achieved. The number of ion to neutral gas collisions that occur as an ion transverses the rod length is a function of the background pressure as well as the rod length. The longer the rods, the more collisions which occur for an ion traversing the rods in a given background pressure. The multipole ion guide assembly 40 was constructed with an effective inner diameter smaller than 2.5 millimeters to minimize the neutral gas conduction between vacuum stages 41 and 42. The rod length in vacuum stage 41 was 2.9 cm and the rod length in stage 42 was 3.0 cm. For this multipole ion guide configuration and background pressure gradient tested, the AC voltage applied was kept below the point where electrical breakdown occurred between the rods. To determine which values of $q_n$ allow a stable trajectory for an ion with a given m/z and charge state, the multipole RF amplitude was ramped for set frequencies ranging from 1 to 10 MHz.

Figure 4:
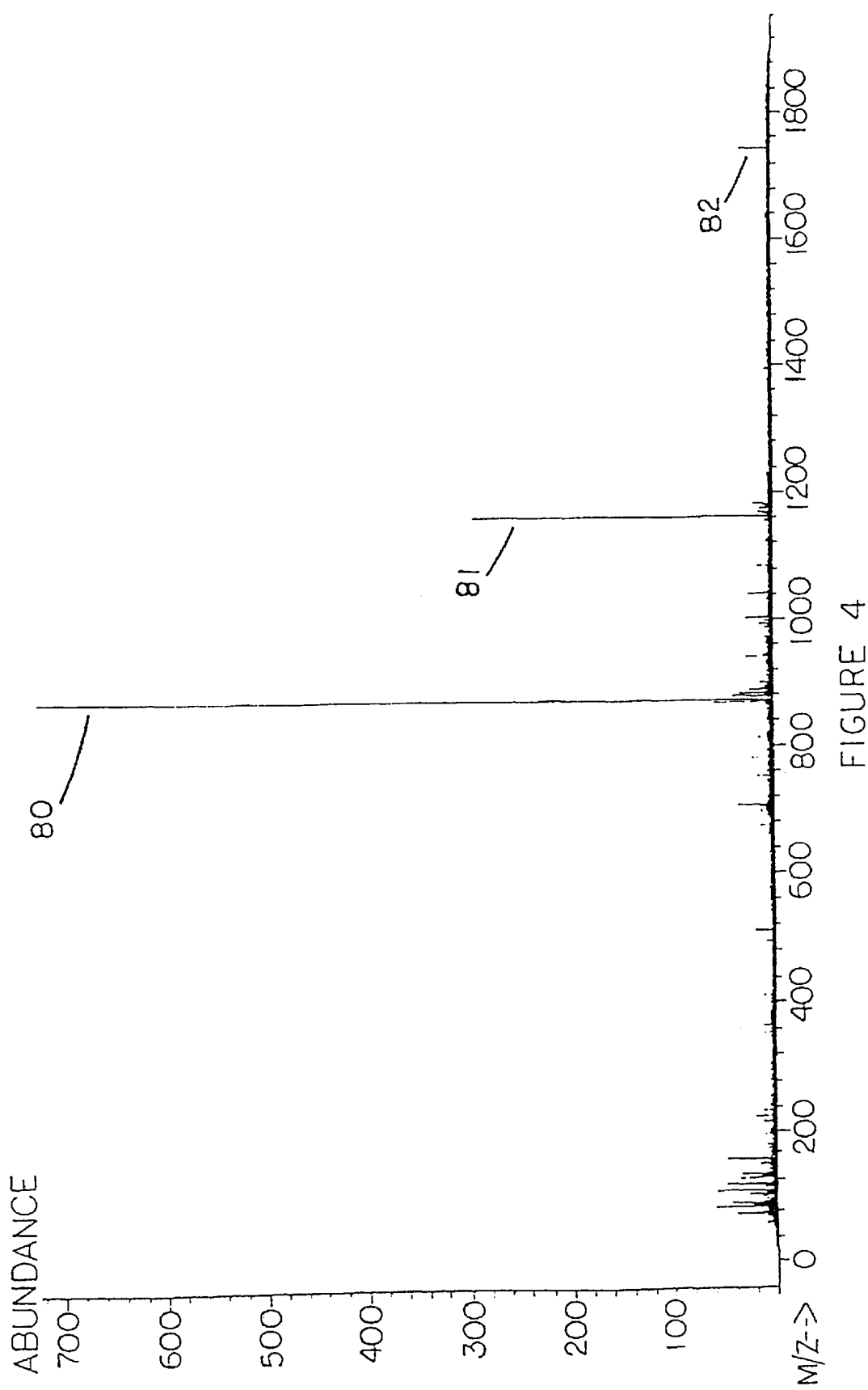
FIG. 4 is a mass spectrum of Glucagon with the two vacuum pumping stage multipole ion guide $q_n$ value set to pass a wide range of m/z values.

An example a test series is given in FIGS. 3a, 3b and 3c taken with following background pressures: pumping stage 53 was 2 torr, pumping stage 41, 150 millitorr, pumping stage 42, $4 \times 10^{-4}$ torr and pumping stage 54 was $6 \times 10^{-6}$ torr. For the data taken in FIG. 3a, the quadrupole mass filter was scanned from m/z 109.6 to 110.6. The ion signal was measured at each 1 MHz step of the RF frequency varying the RF amplitude to find the maximum signal. At each RF frequency the RF amplitude was ramped from minimum to maximum and then ramped back to its minimum value. At point 61 in FIG. 3a the two vacuum stage multipole ion guide is being operated in the AC-only mode with its RF frequency set at 3 MHz and the RF amplitude set low. As the RF amplitude is ramped to its maximum value at 62, the ion transmission efficiency reaches its maximum at 63 for this frequency and m/z. From 62 the amplitude is ramped down to its original low value at 64 where little or no ion transmission is observed. The signal maximum observed at 65 has the same RF amplitude as at 63 as expected since the same value of $q_3$ occurs at points 63 and 65. At an RF frequency of 5 MHz, the RF amplitude is ramped from a minimum value at 66 to a maximum at 67 returning to a minimum at 68. The relatively flat top shape of the ion signal which occurs between 78 and 67 indicates that very efficient ion transmission at m/z 110 is occurring over a range of RF amplitude or $q_3$. FIG. 3b shows the ion transmission efficiency for m/z 872 generated simultaneously with the data shown in FIGS. 3a and 3c. The quadrupole mass filter was scanned from m/z 871.7 to 872.7 while applying the same values of RF frequency and amplitude as were run for m/z 110 in FIG. 3a. The RF amplitude was set at 1 MHz with a low amplitude at 69. As the RF amplitude was increased from a minimum at 69 to a maximum at 71, the maximum ion transmission occurred at 70. As expected, the maximum ion transmission occurs at the same $q_3$ value when ramping the RF amplitude from its maximum value at 71 back to its minimum at 72. When the frequency is increased to 3 MHz and the RF amplitude ramped from a minimum at 73 to a maximum at 74 back to a minimum at 75, efficient ion transmission is achieved over a wide range of RF amplitude or $q_3$. FIG. 3c shows the ion transmission efficiency for m/z 1743 (scanned from 1742.5 to 1743.5) over the same RF frequency and amplitude ranges as were used for m/z 110 shown in FIG. 3a. FIG. 3 illustrates that for a given background pressure gradient, varying orders of magnitude over the multipole ion guide length, efficient ion transmission through the ion guide operated in the AC-only mode can be achieved for a broad range of m/z values. For example, if the maximum efficiency in ion transmission were desired over the entire range of m/z tested in FIG. 3 then the RF frequency would be set at 4 MHz and run with an RF amplitude that could fall roughly at the $q_3$ value indicated at point 76. For this fixed value of $q_3$ and background pressures at which the transmission efficiencies were measured, m/z values from less than 110 to over 1743 would be efficiently transmitted through the multipole ion guide. FIG. 4 is a mass spectrum of Glucagon taken with the ion guide $q_3$ value set at the point indicated by 76 in FIG. 3. A solution of 2 picomole/µl of Glucagon in 1:1 methanol:water was Electrosprayed using continuous infusion sample introduction in an API/MS instrument as configured in FIG. 2 and the quadrupole mass spectrometer was scanned from 20 to 1900 m/z. The $(M+4H)^{+4}$, $(M+3H)^{+3}$ and $(M+2H)^{+2}$ Glucagon peaks are indicated by 80, 81 and 82 respectively. The use of a multiple pumping stage multipole ion guide to transmit and focus ions exiting from a free jet expansion into a mass analyzer allows flexibility in configuring an API/MS instrument without compromising sensitivity. Smaller multiple pumping stage API/MS instruments can be configured with vacuum pumps chosen to minimize instrument cost without compromising performance. Multiple pumping stage multipole ion guides can be configured and operated to allow efficient ion transmission and focusing over a a wide range of pressure gradients. Multipole ion guides can be configured for use with a number of mass analyzer types which may require different operating pressure regimes. For example a quadrupole mass analyzer can operate efficiently at a vacuum pressure of $2 \times 10^{-5}$ torr or below whereas a TOF analyzer requires background pressures in the low $10^{-7}$ torr range or lower to avoid significant numbers of collisions between ions and background gas during the ion flight time. A multiple vacuum pumping stage API/MS instrument with a single or a multiple pumping stage multipole ion guide can be configured to maximize ion transmission and focusing yet minimize pumping cost.

Figure 5A:
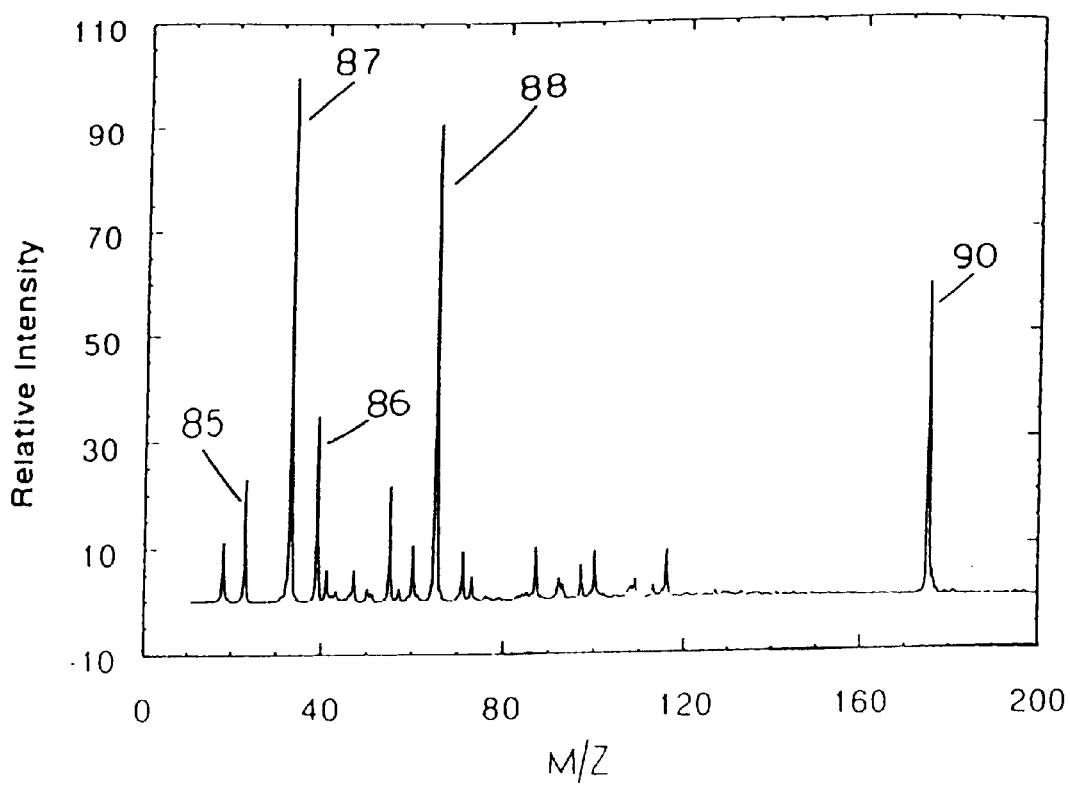
FIG. 5a is an Electrospray mass spectrum of Arginine where the multipole ion guide $q_n$ value is set to pass a broad range of m/z values.
Figure 5B:
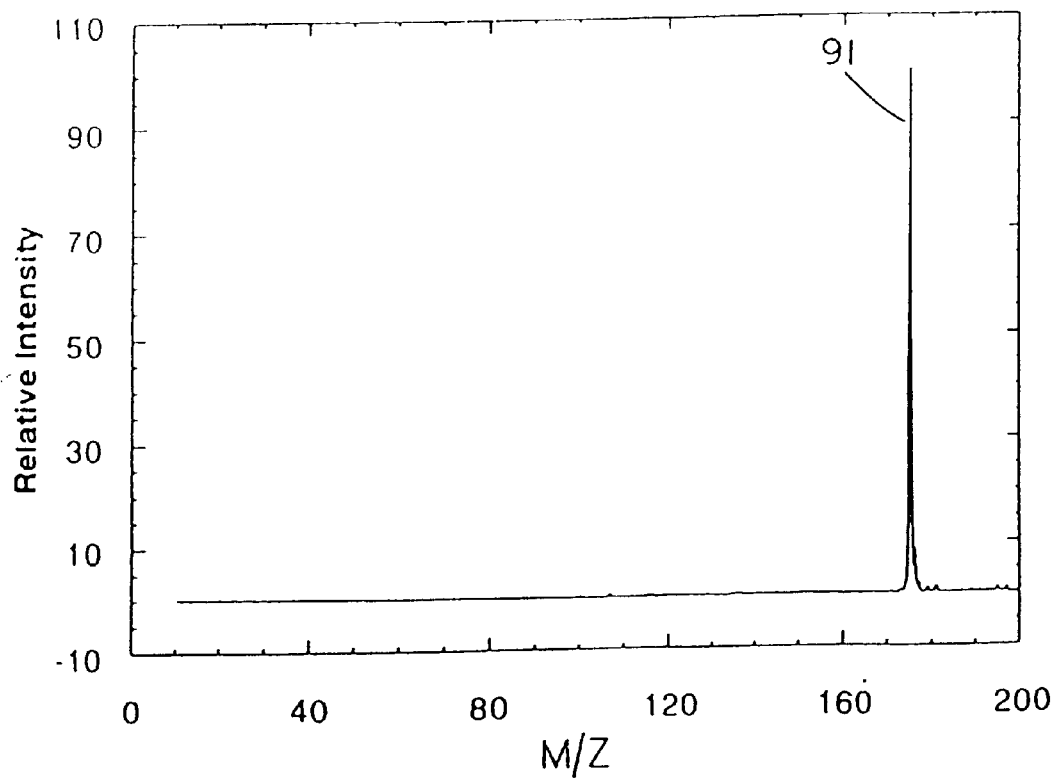
FIG. 5b is a mass spectrum of Arginine where the multipole ion guide $q_n$ value is set so that a low m/z cutoff ion transmission occurs.
Figure 6A:
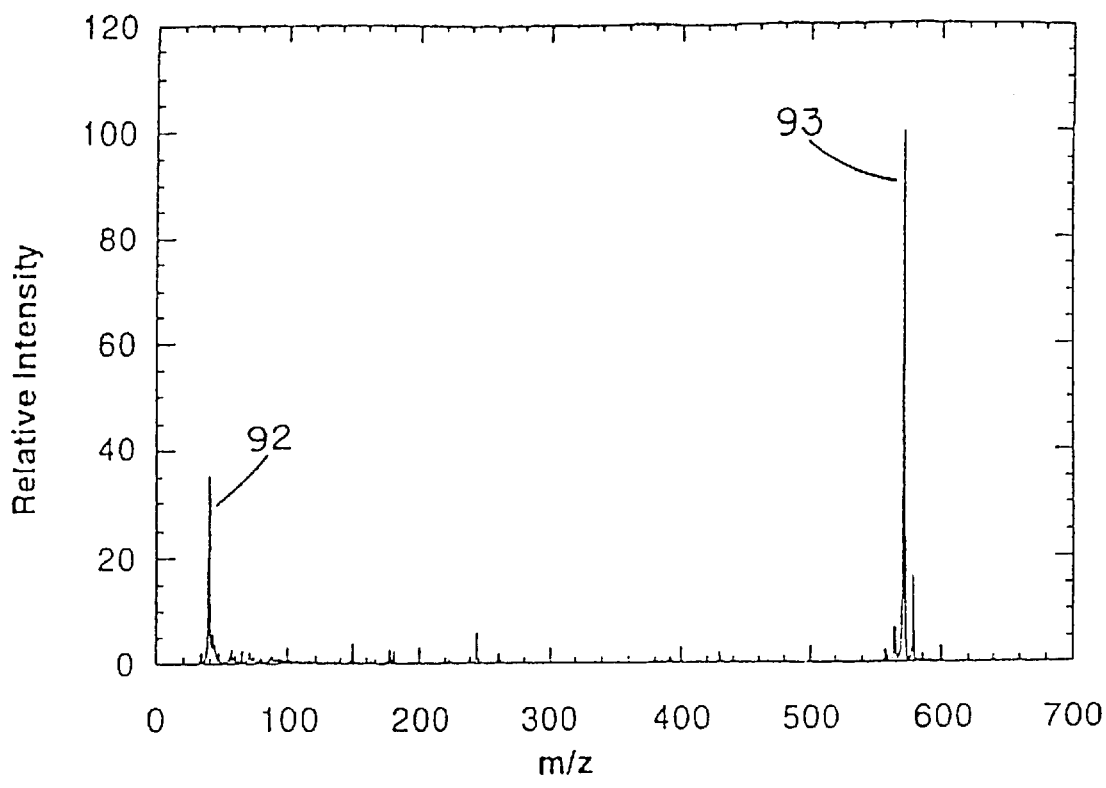
FIG. 6a is an Electrospray mass spectrum of Gramicidin S where the multipole ion guide $q_n$ value is set to pass a broad range of m/z values.
Figure 6B:
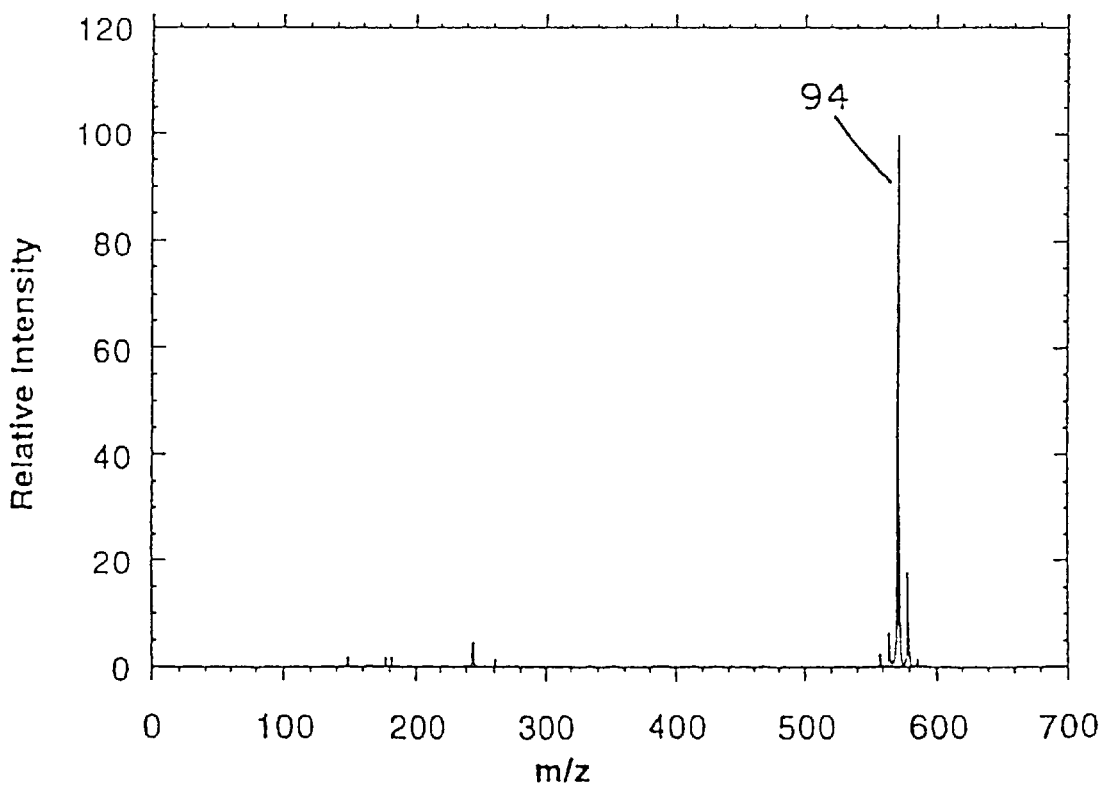
FIG. 6b is a mass spectrum of Gramicidin S where the multipole ion guide $q_n$ value is set so that a low m/z cutoff ion transmission occurs.
Figure 7A:
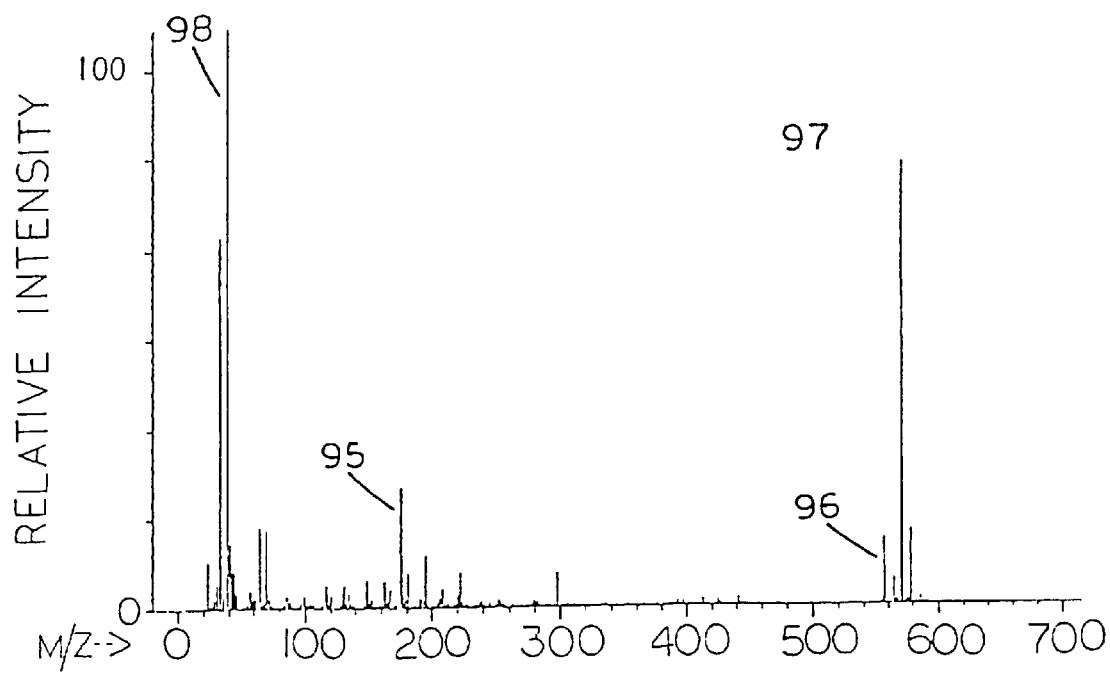
FIG. 7a is an Electrospray mass spectrum of a mixture of Arginine, Leucine Enkephalin and Gramicidin S where the multipole ion guide $q_n$ value is set to pass a broad range of m/z values.
Figure 7B:
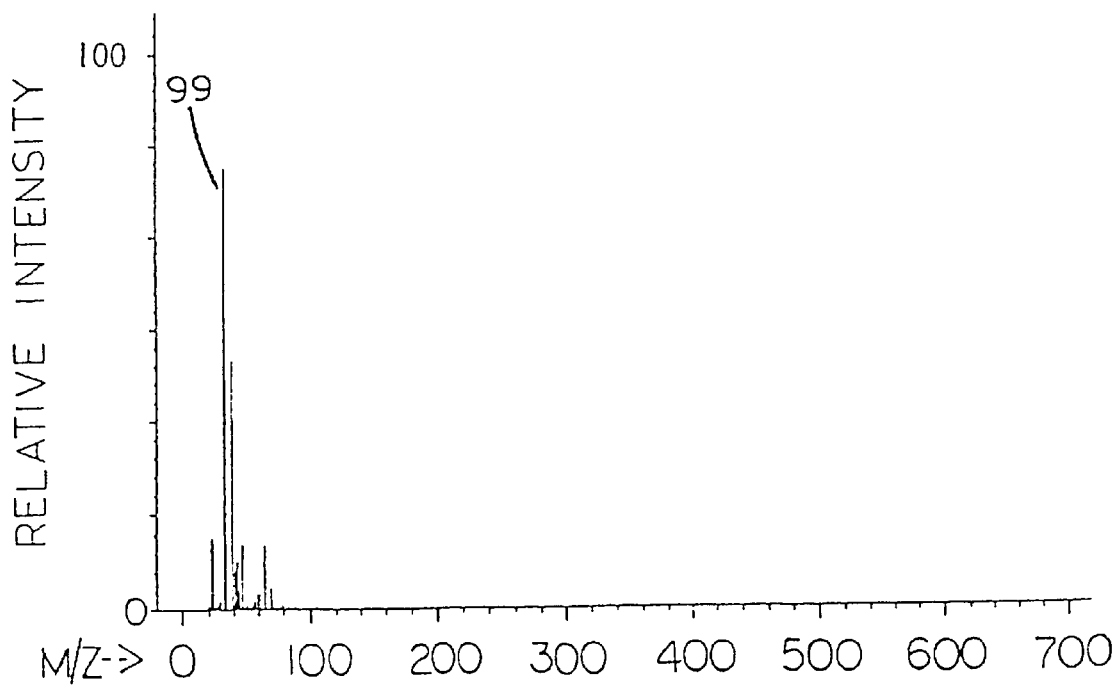
FIG. 7b is a mass spectrum of a mixture of Arginine, Leucine Enkephalin and Gramicidin S where the multipole ion guide $q_n$ value is set so that a high m/z cutoff ion transmission occurs.

FIG. 3 illustrates that the $a_n$ and $q_n$ values can be set so that a low or a high m/z cutoff in ion transmission occurs. For example if the RF frequency were set at 3 MHz and the RF amplitude operated anywhere from point 79 to 62 then ions with m/z 110 or lower would not be transmitted through the multipole ion guide to the mass analyzer. Similarly, if the RF frequency were operated at 7 MHz with the RF amplitude set at the value indicated by 77 then a high m/z cutoff in ion transmission through the ion guide to the mass analyzer would occur. FIGS. 5a and 5b illustrate operation of the multipole ion guide 40 with the $q_n$ value set for passing a broad range of m/z and the $q_n$ value set at a point where a low m/z transmission cutoff occurs. FIG. 5a is a mass spectrum taken from electrospraying a solution of 2 picomole/µl of Arginine in 1:1 methanol:water using continuous infusion with the multipole ion guide 40 $q_3$ value set to transmit a wide range of m/z values. The cation impurities of sodium 85 (m/z 23) and potassium 86 (m/z 39) present in solution appear in the mass spectrum as well as the protonated methanol monomer 87 (m/z 33) and dimer 88 (m/z 65) and the sample Arginine protonated peak 90 at m/z 175. FIG. 5b shows a mass spectrum taken with the same solution being Electrosprayed under identical spray conditions but with the hexapole ion guide $q_3$ value was set so that a low m/z cutoff occurs. Ion transmission below 100 to 120 m/z has been effectively cut off without reducing the ion transmission efficiency of Arginine 91 or higher m/z values. Another example of this is illustrated in FIGS. 6a and 6b where a 2 picomole/µl sample of Gramicidin S in 1:1 methanol:water was Electrosprayed with continuous infusion using the API/MS configuration illustrated in FIG. 2. In FIG. 6a the hexapole 40 $q_3$ value is set to transmit a wide m/z range and an impurity potassium peak 92 and the protonated doubly charged Gramicidin S peak 93 $(M+2H)^{+2}$ are observed in the mass spectrum. FIG. 6b is a mass spectrum of the same Gramicidin S solution Electrosprayed using identical conditions as in FIG. 6a but with the hexapole 40 $q_3$ value is set so that a low m/z cutoff occurs. The potassium ions are no longer transmitted to the mass analyzer but the ion transmission efficiency of the doubly charged Gramicidin S ions as shown by peak 94, is still retained. A $q_n$ value can also be selected to cause a high m/z cutoff as illustrated in FIGS. 7a and 7b where a mixture of Arginine, Leucine Enkephalin and Gramicidin S, 2 picomole/ul each in 1:1 methanol:water was Electrosprayed using the API/MS configuration shown in FIG. 2. FIG. 7a is a mass spectrum taken where the multipole ion guide 40 $q_3$ value was set to transmit a wide range of m/z values. The Arginine $(M+H)^+$ peak 95, Leucine Encephalon $(M+H)^+$ peak 96 and doubly charged Gramicidin S $(M+2H)^{+2}$ peak 97 are present in the mass spectrum as well as the lower m/z ion peaks 98. FIG. 3b is a mass spectrum taken where the same solution is Electrosprayed using identical spray conditions except that the ion guide 40 $q_3$ value has been set so that the lower m/z ions are transmitted as indicated by peaks 99 but the higher m/z ions are not transmitted through the multipole ion guide 40.

A valuable feature of multipole ion guides when operated in higher background pressures is that ions traversing the length of the ion guide experience a number of collisions with the background gas resulting in the cooling of the ion kinetic energy. As the ions enter the multipole ion guide and are transmitted through it, the RF or combined RF-DC field effectively traps the ions from dispersing in the radial direction due to collisions with the background gas yet permits movement of ions in the axial direction often driven by the gas dynamics. Ions which experience a number of low energy collisions with the neutral gas within the multipole rod assembly have their kinetic energy reduced resulting in a narrowing of the ion energy spread for those ions which exit the multipole rods. The number of collisions an ion experiences as it travels the length of the ion guide is a function of the rod length and the background pressure inside the rods. If the relative voltages of the capillary exit lens 50, ring lens 51, skimmer 47 and the multipole ion guide 40 DC offset potential remain the same then the ions entering the multipole ion guide will have similar energy spreads and will be transmitted to the exit of the multipole ion guide with the same efficiency. With the relative upstream lens potentials held constant with the ion guide DC offset potential, the ion kinetic energy cooling due to collisions will remain consistent as the multipole DC offset potential is adjusted. Consequently, with a multipole ion guide operated in a higher vacuum pressure region where ion collisional cooling occurs, the narrow energy spread of the ions can be maintained independent of changes in the mean ion energy when the ion guide DC offset potential is adjusted.

Figures 8A, 8B, 8C:
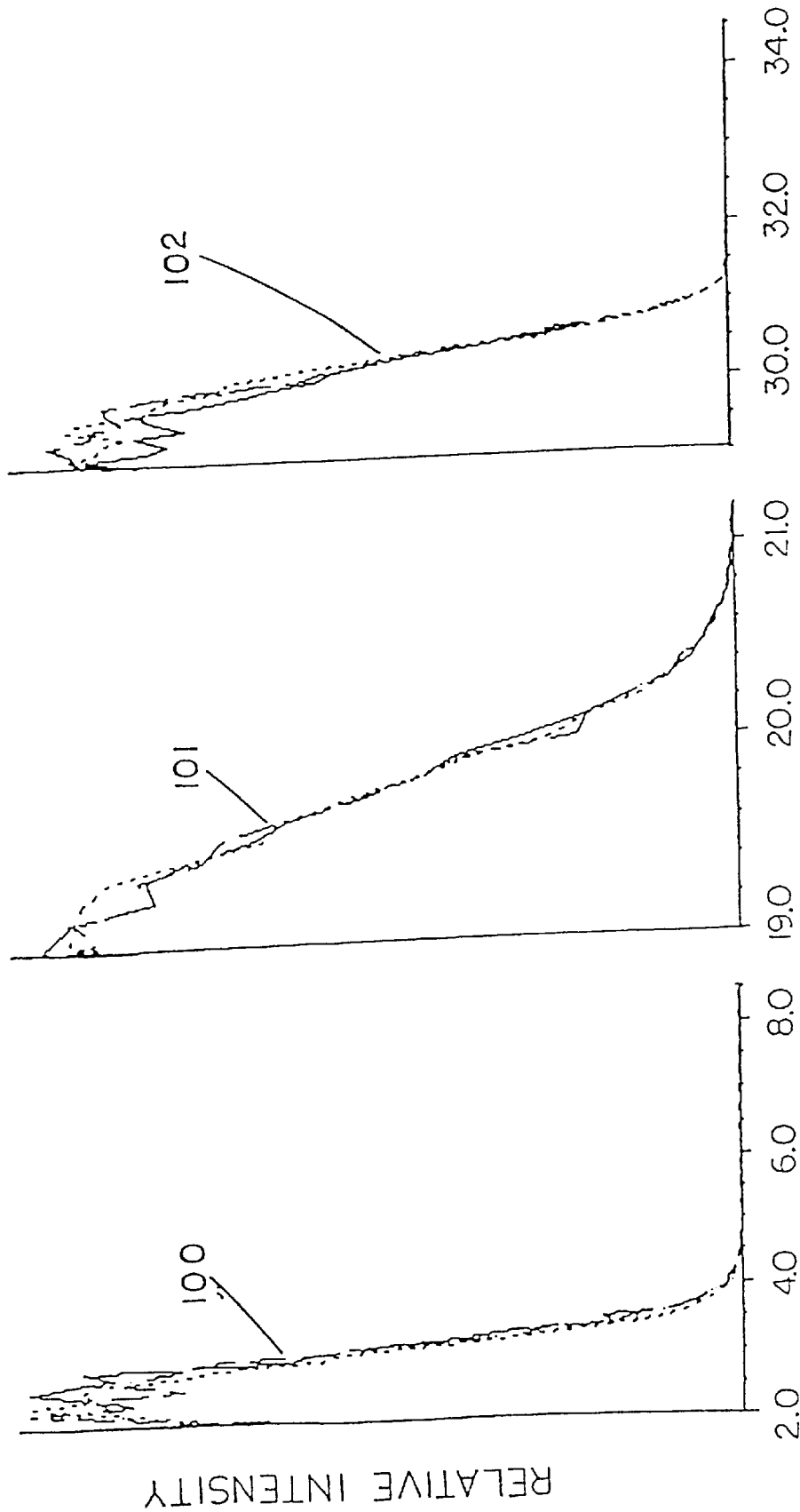
FIG. 8a is a curve of ion signal for m/z 571 versus the multipole ion guide exit lens potential for a multipole ion guide DC offset potential set at 0.1 volts.
FIG. 8b is a curve of ion signal for m/z 571 versus the multipole ion guide exit lens potential for a multipole ion guide DC offset potential set at 15.3 volts.
FIG. 8c is a curve of ion signal for m/z 571 versus the multipole ion guide exit lens potential for a multipole ion guide DC offset potential set at 25.1 volts.

To illustrate this point, the energy spread of a doubly charged Gramicidin S $(M+2H)^{+2}$ on (m/z 571) was measured by ramping the voltage of lens 53 in FIG. 2 while monitoring the mass spectrometer ion signal. This technique will not give a precise profile of ion energy because lens 53 is a focusing element as well as having the ability to apply stopping potentials. However, even though the focusing characteristics will change slightly as the voltage of 53 is ramped, the boundaries of ion energy for a given m/z can be attained. Using the multipole ion guide configuration of FIG. 2 and maintaining background pressure in vacuum stage 53 at 2 torr, vacuum stage 41 at 150 millitorr, vacuum stage 42 at $4\times10^{-4}$ torr and vacuum stage 54 at $6\times10^{-6}$ torr, the mean ion energy was changed by adjusting the DC offset potential of the hexapole relative to the quadrupole entrance aperture 47 ground potential. FIGS. 8a, b and c show the ion signal of the Gramicidin S protonated doubly charged peak $(M+2H)^{+2}$ for three different hexapole ion guide 40 DC offset potentials. In FIG. 8a the hexapole ion guide 40 was operated in the AC only mode with the DC offset potential set at 0.1 volt relative to the quadrupole entrance aperture 47. FIG. 8a shows the ion signal level 100 at m/z 571.6 for three consecutive voltage ramps of lens 53 from 2 to 8.2 volts. Over ninety percent of the m/z 571.6 ions fall within a one volt window of ion energy. FIG. 8b shows the ion signal 101 at m/z 571.6 for three consecutive voltage ramps of lens 53 from 19 to 21.2 volts with the hexapole ion guide 40 DC offset potential set at 15.3 volts. Ninety percent of the 571.6 m/z ions detected have an energy that falls within a one volt window. Similarly, FIG. 8c shows the ion signal 102 at m/z 571.6 for three consecutive voltage ramps of lens 53 from 29 to 35 volts with the hexapole ion guide 40 DC offset potential set at 25.1 volts. Once again, over ninety percent of the m/z 571.6 ions exiting the hexapole ion guide 40 are within a 1 volt energy window. The mean ion energy ranges from roughly 3 to 5.2 volts higher than the DC offset potential set on the hexapole ion guide 40 in FIGS. 8a, b and c. Ion acceleration driven by the expanding gas in the free jet occurring in vacuum stage 51 may account for 2.6 to 3 volts of this added ion energy for Gramicidin S ions. It is not yet certain where the one to two volts of energy over 3 volts is added as the multipole ion guide DC offset potential is raised. The efficient transport of ions with low energy spread combined with the ability to control the average ion energy for a given m/z by adjusting the multipole ion guide 40 DC offset potential, allows higher sensitivity to be achieved at higher resolution for many mass analyzer types.

Figure 9:
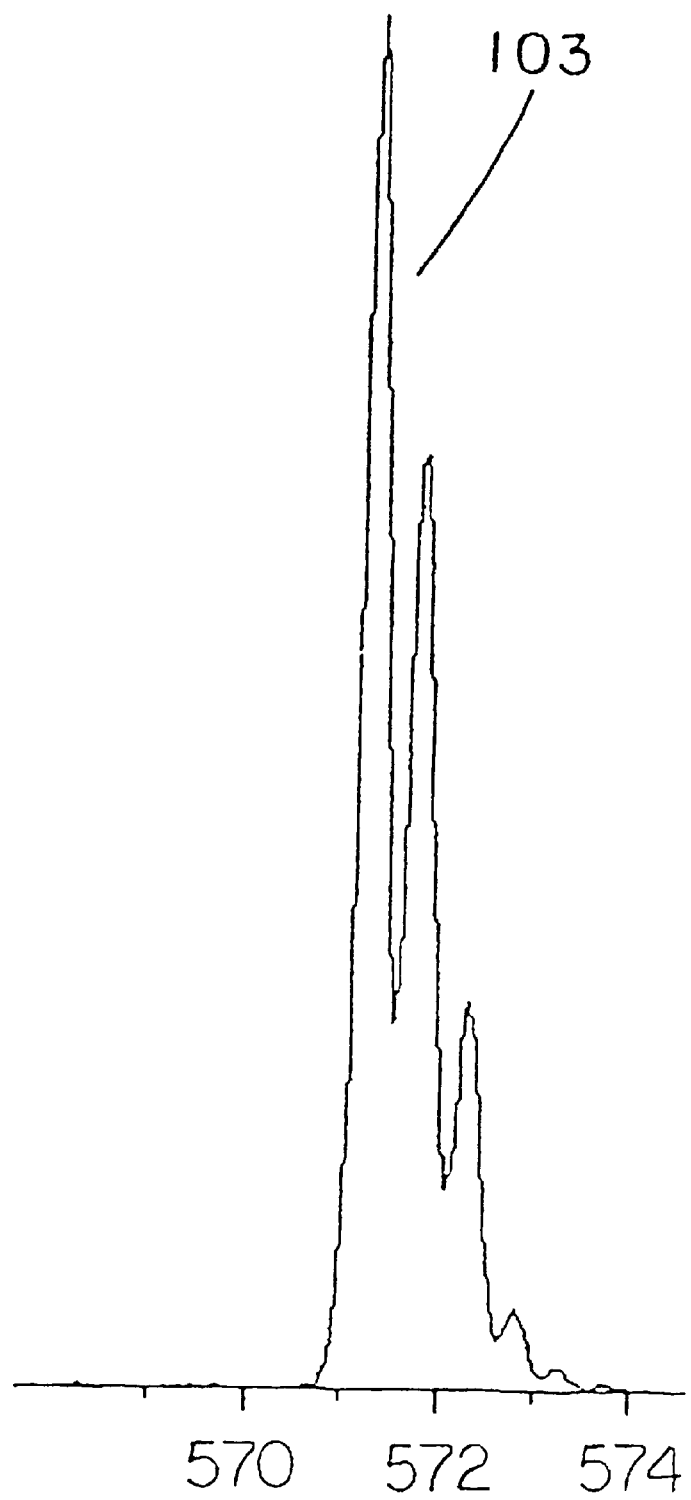
FIG. 9 is a spectrum of a doubly charged Gramicidin S peak scanned with the multipole ion guide offset potential set at 0.1 volt.

An API/MS system which incorporates a multipole ion guide with a portion of its length operating in a vacuum pressure which is high enough to cause collisional cooling as ions traverse the rod length allows three significant performance features. The first is that the ion guide operated in the presence of sufficient background collisions can reduce the ion energy spread without reducing ion transmission efficiency when run with the proper values of $a_n$ and $q_n$ set. Second, the mean ion energy for a given m/z can be adjusted by changing the DC offset potential of the multipole ion guide without causing significant changes in ion energy spread. Third, the ion energy can be adjusted by changing the ion guide DC offset potential without reducing the ion transmission efficiency through the multipole ion guide. An example to illustrate these three features is given in FIG. 9 which shows a mass spectrum 103 of a doubly charged protonated Gramicidin S $(M+2H)^{+2}$ peak with partially resolved isotope peaks. The spectrum was taken by electrospraying a 2 picomole/ul Gramicidin S sample in a 1:1 methanol: water solution using an API quadrupole mass spectrometer system as configured in FIG. 2. The DC offset potential of hexapole 40 was set to 0.1 volts relative to the ground potential quadrupole entrance aperture 47. With this low ion guide DC offset voltage setting, higher resolution was achievable at comparable sensitivities than could be attained with the hexapole DC offset potential set at 15 volts. At lower ion energies, transmission losses can occur between the multipole ion guide exit 52 and the quadrupole mass filter 57 depending on the focusing and transfer characteristics of static voltage lenses 53 and 47 in the presence of the multipole ion guide 40 and the quadrupole mass filter 57 fringing fields. The performance tradeoffs between ion energy, resolution and signal level for the quadrupole mass filter 57 used, favored lower energy ions when scanning with higher resolution settings. Using a static voltage lens system as illustrated in FIG. 1 the resolution and sensitivities shown in FIG. 9 could not be achieved. The use of a multipole ion guide operated with the appropriate $a_n$ and $q_n$ setting in a region where background pressures are high enough to cause collisional cooling of ions as they traverse the length of the ion guide improves API/MS system performance when compared with static lens configurations having little or no ion kinetic energy cooling.

Figure 10:
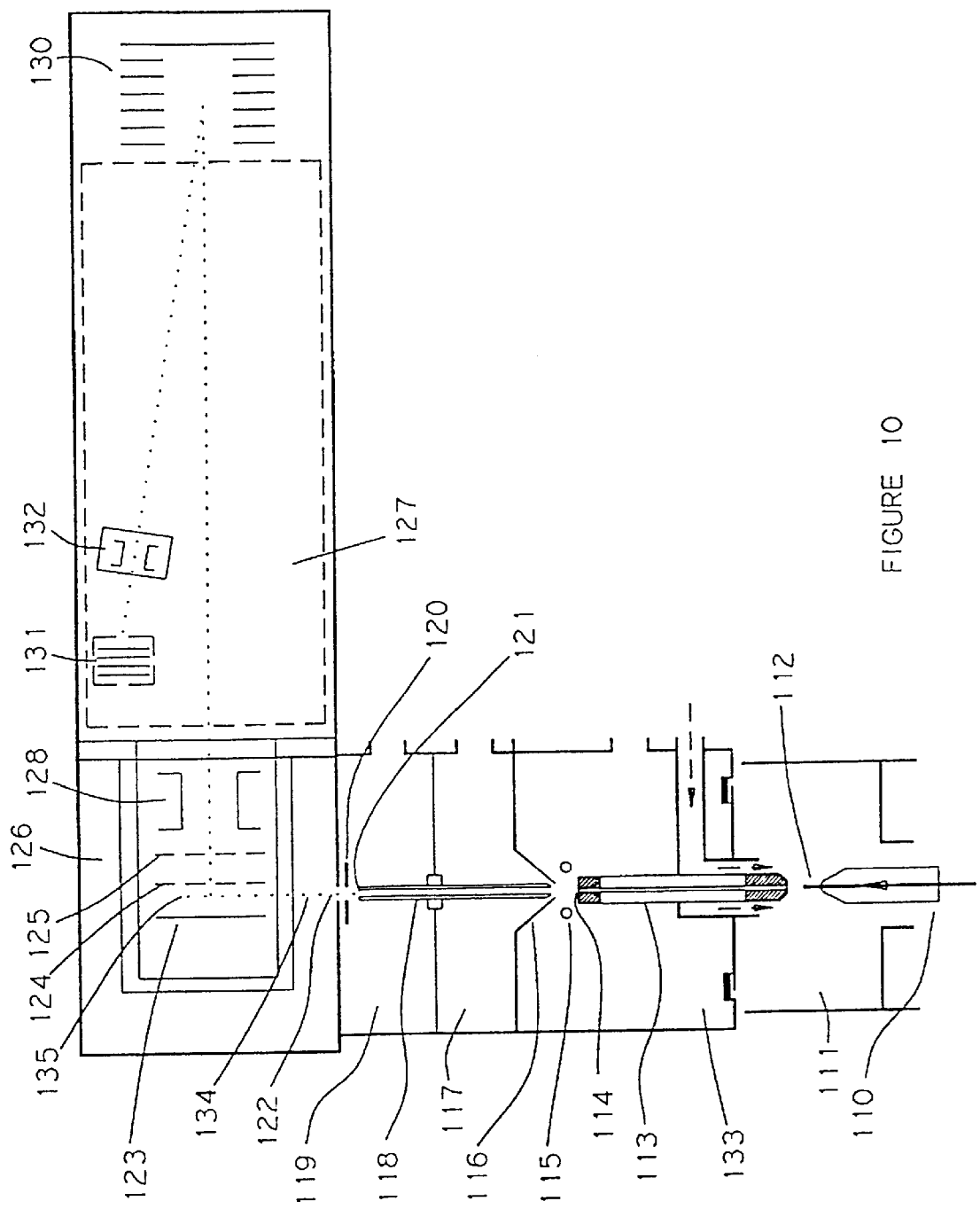
FIG. 10 is a diagram of a four vacuum stage ES/MS Time-OF-Flight instrument with orthogonal pulsing including a multipole ion guide beginning in the second vacuum pumping stage and extending into the third vacuum pumping stage.

The performance capabilities of a multipole ion guide operated in a background pressure region where ion kinetic energy cooling occurs can be used to improve the performance of different mass spectrometer types. The advantages of improved ion transmission efficiencies when using multiple vacuum pumping stage multipole ion guides in conjunction with quadrupole mass analyzers was illustrated with examples given above. The ability to set the mean ion energy by adjusting the multipole DC offset potential without changing the narrow energy spread per m/z value can be used to improve the resolution and sensitivity of scanning and non-dispersion mass analyzers including quadrupole, magnetic sector, TOF, ion trap and FT-ICR mass spectrometers. Higher API/MS system sensitivities and resolutions can be achieved and pumping costs minimized when multipole ion guides which extend through two or more vacuum pumping stages are used in the initial vacuum pumping stages before the mass analyzer. The ability to operate a multipole ion guide in a mode where a cutoff in ion transmission for a given m/z range is set offers little operational advantage when applied with scanning or dispersion mass analyzers such as magnetic sector or quadrupole mass filters. These dispersion or scanning mass analyzer types transmit ions only in a narrow range of m/z at any given time to the detector. However, for mass analyzers which are non dispersion such as TOF, ion traps and FT-ICR which analyze packets of ions, the ability of the multipole ion guides to limit the range of m/z values transmitted into the mass analyzer can enhance system performance. FIG. 10 is a diagram of a four vacuum pumping stage orthogonal pulsing API/MS system with a reflectron Time-Of-Flight mass analyzer. For illustration purposes, an electrospray ion source is shown as the API source although this could alternatively be an APCI or an ICP source as well. Sample bearing liquid is introduced through the electrospray needle 110 and is Electrosprayed or nebulization assisted Electrosprayed into chamber 111 as it exits the needle at 112. The charged droplets produced, evaporate and desorb gas phase ions both in chamber 111 and as they are swept into vacuum through the annulus in capillary 113. A portion of the ions that enter the first vacuum stage 133 through the capillary exit 114 are focused through the orifice 136 in skimmer 116 with the help of lens 115 and the potential set on the capillary exit 114. Ions passing through skimmer orifice 136 enter the multipole ion guide 118. The ion guide 118 begins in vacuum pumping stage 117 and extends unbroken into vacuum stage 119. If the multipole ion guide AC and DC voltages are set to pass ions falling within a range of m/z then ions within that range which enter the multipole ion guide will exit at 121 and are focused with exit lens 120 through the TOF analyzer entrance orifice 122. This primary ion beam 134 ion beam passes between electrostatic lenses 123 and 124 located in the fourth pumping stage 126. The relative voltages on lenses 123, 124 and 125 are pulsed so that a portion of the ion beam 134 falling in between lenses 123 and 124 is ejected as a packet through grid lens 125 and accelerated down flight tube 127. The ions are steered by x and y lens sets diagrammatically illustrated by 128 as they continue their movement down flight tube 127. In the configuration shown, the ion packet is reflected through a reflectron or ion mirror 130 and detected at detector 131. As a pulsed ion packet proceeds down flight tube 127, ions with different m/z separate in space due to their velocity differences and arrive at the detector at different times. The use of orthogonal pulsing in an API/TOF system helps to reduce the ion energy spread of the initial ion packet allowing higher resolution and sensitivity to be achieved.

For a given primary ion beam current passing through the mass analyzer aperture 122, the lower the ion energy, the more ions that will be present in the pulsing region per pulse. This has a direct impact on the ion signal response that can be achieved per pulse. Also, the lower the primary ion beam electrostatic energy, the less ion density versus m/z discrimination that will occur in pulsing region 135. This discrimination occurs because the lower m/z ions accelerated electrostatically will move faster than the higher m/z ions and consequently will have less relative density for a similar ion current per m/z in the pulsing region. A distinction is made here between ions accelerated electrostatically and those accelerated due to gas dynamics in the free jet. Although some slippage occurs for higher molecular masses, ions accelerated solely by the neutral gas expanding into vacuum in a free jet form an ion beam that is closer to being mono-velocity rather than mono-energetic. Electrostatic acceleration in the absence of collisions with background gas will create an ion beam that is closer to being mono-energetic. A mono-velocity beam entering pulsing region 135 will reduce the differences in ion density versus m/z for a given ion flux and hence allow generation of a mass spectrum whose relative peak heights are more representative of the relative m/z intensities in the original ion beam 134. The translational energy of ions in the primary ion beam 134 will be the sum of the energy imparted by the expanding gas and by electrostatic acceleration. Multipole ion guide 118, a portion of which is operated in a higher pressure vacuum region, can deliver an ion beam having low translational energy through the mass analyzer orifice 122 with minimal beam divergence. When static lens systems are used, lowering of the ion beam energy generally results in increased beam divergence. Beam divergence will not only reduce the ion beam intensity entering aperture 122 but will also increase the beam cross sectional area in pulsing region 135. Primary ion beam divergence can result in reduced resolution in an orthogonal pulsed TOF geometry. Use of the multipole ion guide 118 to aid in delivering ions to the pulsing region can reduce the degree of ion beam divergence for lower ion beam energies. The net result is improved sensitivity and resolution.

The effective inner diameter of multipole ion guide 118 is reduced to minimize the neutral gas conduction between vacuum pumping stages 117 and 119 without compromising ion transmission efficiency. The effective inner diameter for multipole ion guide 118 is typically 2.5 millimeters or less. The ion guide geometry itself places an upper limit on the cross section of the ion beam exiting at 121. By limiting the ion beam diameter exiting multipole ion guide 118 to less than 2 mm, aperture 122 can be reduced to 2 mm with little or no loss ion transmission efficiency into pulsing region 135. The smaller the aperture 122 size the less neutral gas that will pass into vacuum pumping stage 126, reducing the vacuum pumping speed requirements and lowering instrument cost. The smaller the primary ion beam 134 which enters pulsing region 124, the less spatial spreading which occurs before the ions are pulsed out of region 135 and into flight tube 127. With orthogonal pulsing, reducing the ion beam 134 width can reduce the pulsed ion packet width or spatial and energy spread, potentially resulting in increased TOF sensitivity and resolution performance.

A narrow ion energy spread is desirable in orthogonal pulsing TOF because the orthogonal component of ion energy which is the initial ion beam energy, translates into sideways movement of ions as they traverse the flight tube. The lower the energy spread in the initial ion beam the tighter the initial m/z ion packet remains in the radial direction as it travels through flight tube 127 resulting in more ions focused onto the surface of detector 131. As shown in FIG. 8, operation of a multipole ion guide in a vacuum pressure regime where ion kinetic energy cooling occurs results in narrowing of the ion energy spread and the ability to lower ion energy without reducing the ion transmission efficiency or increasing the ion energy spread. The ability to lower ion energy while maintaining a low ion energy spread can help to improve the sensitivity and increase the duty cycle of a TOF mass analyzer. Ions of a given m/z and energy will take time to refill the gap between lenses 123 and 124 after a pulse has occurred. If the length of the gap is roughly 2 cm then an ion at m/z 1000 with 20 volts of energy will take 10.2 μsec to travel 2 cm and fill the pulsing space. The same ion at 3 volts of energy will take 26.3 μsec to travel 2 cm and fill the pulsing region. Those ions which are not pulsed into the flight tube are lost as they impact the walls of pulsing region 134 and are neutralized. If the ion packets are pulsed at a rate of 10,000 times per second, that is once every 100 μsec, then pulsing a 3 volt primary ion beam 134 will improve the duty cycle and consequently the sensitivity by a factor of 2.6 when compared with pulsing a primary ion beam 134 having 20 volts of translational energy. The ability of a multipole ion guide to deliver ion beam 135 with a small cross section and a mean energy of less than 5 volts, significantly improves performance of an API/TOF system over that which can be achieved using a static voltage lens system.

The ability of the multipole ion guide to selectively transmit a range of m/z values while cutting off the transmission of m/z outside that range can be used to increase the duty cycle and detector sensitivity in an API/TOF system. The duty cycle can be increased in TOF by reducing the range of ion m/z that enters pulsing region 135. Recalling FIGS. 5, 6 and 7, the $a_n$ and $q_n$ values of a multipole ion guide can be set so that the ion guide behaves as a low pass or a high pass filter with m/z transmission cutoff points. If a DC potential is applied to the poles where each adjacent pole has opposite DC polarity, the $a_n$ and $q_n$ values can be selected so that the multipole ion guide will pass a narrower range of m/z. Quadrupoles are commonly used in this mode as mass filters in vacuum pressure regimes that are maintained below $2 \times 10^{-5}$ torr where the effects due to ion collisions with the background gas are negligible. When ± DC is imposed on the multipole rods with considerable background pressure present, the transmission characteristics of each type multipole ion guide or mass filter assembly must tested and qualified. Ion transmission maps of $a_n$ and $q_n$ may not be the same for multipole ion guides with different numbers of poles and operated in different background pressures. One variable which effects duty cycle in a TOF instrument is the repetition rate at which ions are pulsed in the flight tube, accelerated and detected. Assuming that the pulsing region 135 can refill between pulses, that is the primary ion beam 134 energy is set to satisfy this criteria, the pulsing repetition rate will be limited by the fastest flight time of the lowest m/z ion and the slowest flight time of the highest m/z ion in consecutive ion packets traveling through flight tube 127 to the detector. Any overlap of ions from one pulsed packet to the next will increase the difficulty in interpreting the resulting mass spectrum. If ions of lower or higher m/z were not of interest in a given analysis, those ions could be preventing from entering the pulsing region by selecting an appropriate $a_n$ and $q_n$ value for the multipole rod 118 operation. By reducing the arrival time spread of an ion packet as it travels down the flight tube, the time in between pulses can be reduced resulting in an increase in duty cycle.

Consider an example where an API/MS system as diagrammed in FIG. 10 has an effective ion flight length of 2.5 meters and a flight tube ion acceleration energy of 1500 electron volts (ev). The larger the difference in arrival times at the TOF detector between close ion m/z values, the higher the resolution which is theoretically achievable. However, for continuous ion beam API sources, increasing resolution by increasing the arrival time spread of ion packets may reduce duty cycle. Relative flight times in a 2.5 meter TOF tube with an ion accelerating energy of 1500 ev would be as follows for different values of m/z:

| m/z | Flight time (μsec) |
|---|---|
| 1 | 4.6 |
| 19 | 20.3 |
| 100 | 46.5 |
| 500 | 103.9 |
| 1000 | 146.9 |
| 2000 | 207.8 |
| 3000 | 254.5 |
| 5000 | 328.6 |
| 10000 | 464.7 |

Subtracting the slowest from the most rapid flight time of ions present in the pulsed packet will determine the minimum time required in between consecutive pulses to avoid low m/z ions of the trailing pulse catching up with high m/z ions of the leading pulse. If m/z ions ranging from protonated water (m/z 19) to m/z 3000 are present in the pulse ion packets, then a delay of 255 μsec must be maintained between consecutive pulses allowing approximately 3,921 pulses per second. A primary ion beam 134 with ions of m/z of 3000 and lower and with 3 volts of translational energy will fill the 2 cm pulsing gap 135 length in less than 45 μsec. The longer the delay between pulsing of ions into the flight tube, the lower the duty cycle resulting in lower sensitivity for a given primary ion beam intensity. If the ions of interest for a given analysis fell in a narrow m/z window, say below m/z 1000 then the multipole ion guide $a_n$ and $q_n$ values could be set to pass only ions below m/z 1000. The minimum time delay between pulses would be reduced to 147 μsec effectively increasing the duty cycle and potentially sensitivity by a factor of 1.7. Conversely, if the mass range of interest fell above m/z 500 and the m/z values present in the primary ion beam were below 2000 m/z then the multipole ion guide 118 operating $a_n$ and $q_n$ values could be set to reject ions below 500 m/z. The ion packet pulse frequency could be set to over 9500 pulses per second increasing duty for all m/z values transmitted into pulsing region 135.

Layered Multichannel Plate (MCP) electron multipliers are often used for detectors in TOF mass spectrometry. The individual channel recovery time of an MCP channel after an ion hits and causes an electron cascade can be as long as 1 millisecond. If an ion hits the channel before it has recovered then little or no electron cascade will occur and the ion will remain undetected. Lower m/z ions which arrive at the detector first for a given pulsed ion packet could deaden channels for heavier m/z ions which follow. Also if the packet pulse rate exceeds 1000 hertz, that is the time between pulses is shorter than the MCP channel recovery time, this could result in reduction in signal intensity as ions arriving at the detector yield reduced secondary electron cascade intensity because ions from preceding pulses have deadened a number of channels. If the ions of interest for a given analysis fall within a limited m/z range, detector response can be increased for ions of interest by preventing unwanted m/z values from reaching the detector. The multipole ion guide 118 m/z transmission window can be selected to minimize the number of unwanted m/z values from entering the pulsing region 135, eliminating those m/z values from reaching the detector. Selectively preventing ions from reaching the detector has also been accomplished by deflecting a portion of an ion packet as it traverses the TOF tube before it reaches the detector. Ion lenses used for deflecting ions are diagrammatically represented by 132 in FIG. 10. The use of multipole lens to limit m/z values from entering the TOF pulsing region is a complimentary technique to using deflectors in the flight tube. Deflecting lenses, however, will not aid increasing duty cycle unless they are employed very early in the ion flight path, a region where m/z separation may be poor. A linear pulsed API/MS system as reported by Boyle, Whitehouse and Fenn (Rapid Communications in Mass Spectrom. Vol. 5, 400–405, 1991) would have a similar increase in sensitivity and duty cycle by incorporation of a multipole ion guide into the upstream vacuum stages as is achieved in orthogonal pulsing TOF configurations.

Figure 11:
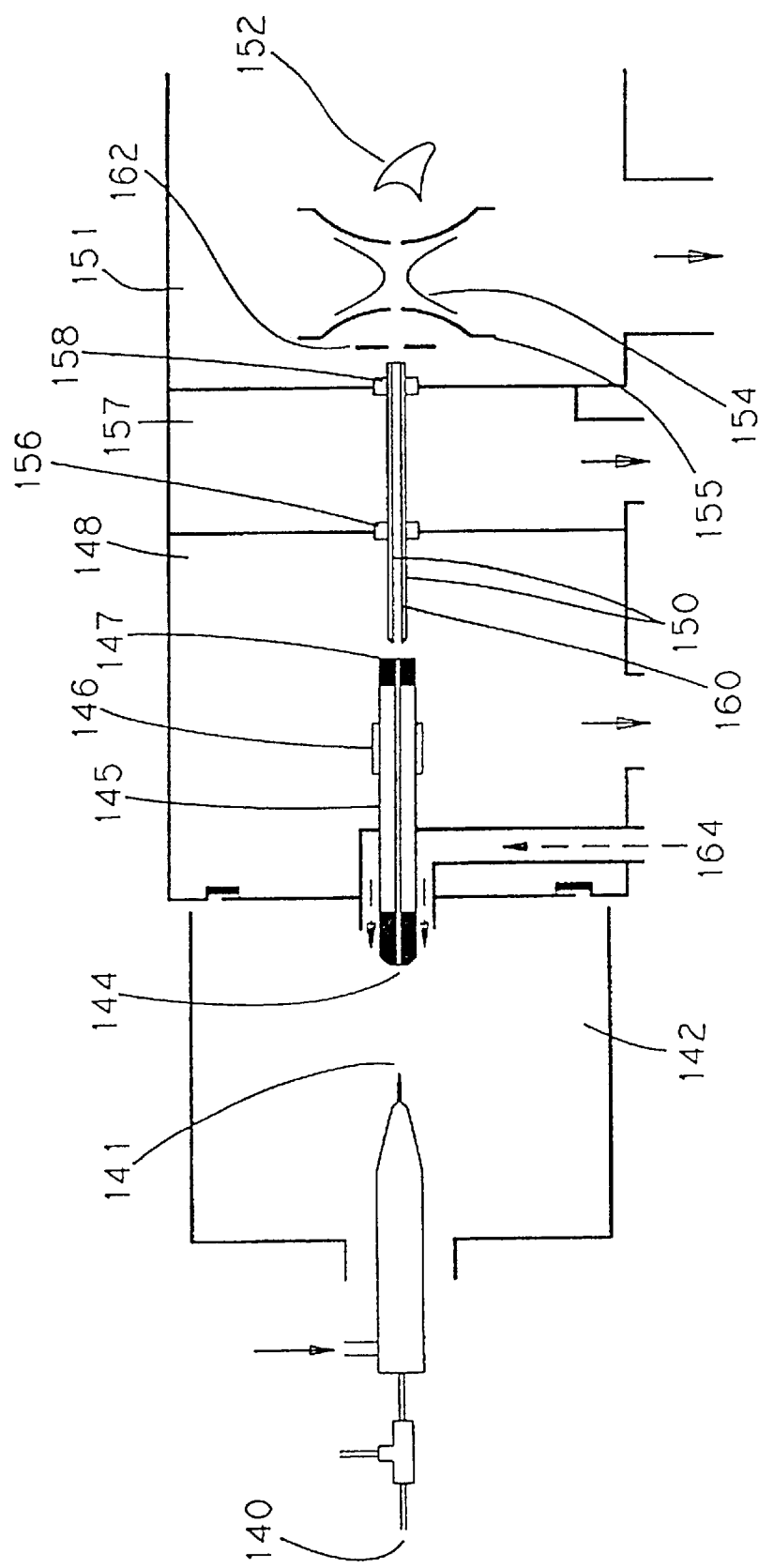
FIG. 11 is a diagram of a three vacuum stage ES/MS ion trap instrument with a multipole ion guide beginning in the first vacuum stage and extending through the second and into the third vacuum pumping stages.

When API sources are interfaced with ion traps and FT-ICR mass analyzers, the use of multipole ion guides in the vacuum transfer optics can be used to improve performance by increasing ion transmission efficiency into the mass analyzer trapping region, lower the ion energy spread and reducing space charge limits for desired m/z ranges by selectively transmitting limited m/z ranges. FIG. 11 diagrams a three vacuum pumping stage API/ion trap system where a multipole ion guide begins in vacuum pumping stage 148 and extends continuously through the three vacuum pumping stages. An electrospray or nebulizer assisted electrospray ion source is shown interfaced to ion trap mass spectrometer 154. Sample bearing liquid is introduced into the electrospray needle entrance 140 and is Electrosprayed or nebulizer assisted Electrosprayed as it emerges from the electrospray needle tip 141. The charge liquid droplets produced in the electrospray chamber 142 drift toward the capillary entrance 144 against a flow of countercurrent drying gas 164. Ions are produced from the evaporating charged droplets and are swept into vacuum through capillary 145. This capillary may be heated by capillary heater 146 which aids in heating the gas expanding through the capillary into vacuum. Ions exiting the capillary at 147 are accelerated into the first vacuum pumping stage 148 by the neutral gas free jet expansion. A large portion of ions exiting the capillary enter the multipole ion guide 165 and are effectively trapped and efficiently transported through its entire length. The ions exit multipole ion guide 165 in the third vacuum stage 151 and are focused into the ion trap 154 through the its endplate 155 by lens 162. The pressure in vacuum stage 148 can range from 0.5 to 2 torr depending on the capillary 145 inner diameter and length, the vacuum pump size chosen and the temperature at which the capillary heater is run. The third pumping stage 151 is usually maintained at a pressure below $5 \times 10^{-5}$ torr to insure proper functioning of the electron multiplier detector 152, however, the internal trap pressure is often set higher than the background pressure in stage 151 by the addition of helium directly into trap 154. The pressure in pumping stage 157 is generally maintained at a pressure less than 150 millitorr.

The multipole ion guide 165 has rods or poles 150 which begin in pumping stage 148, continue unbroken through pumping stage 157 and extend into pumping stage 151. Insulators and mounting brackets 156 and 158 serve the dual purpose of supporting the multipole rod assembly and partitioning the vacuum chambers to minimize the flow of background gas into downstream pumping stages. FIG. 12 illustrates a cross section of a hexapole assembly taken at insulator 156. The six rods 160 are held in an equally spaced position and equal radial distance from the centerline by attachment to insulator 156. The insulator is configured to minimize the effective cross sectional area of the internal opening without distorting the electrostatic field produced by the hexapole rods during operation inside multipole rod assembly cross section area 161. Rod diameters as small as 0.5 mm have been constructed with an inner rod spacing 166 of 2 mm to minimize neutral gas conductance into downstream pumping stages and reduce the size and cost of vacuum pumps required. Increasing the length of insulators 156 and 158 also helps to reduce the neutral gas conductance. The smaller the ion guide assembly internal cross section area 161 with proportionally small rod 160 diameters, the smaller the ion beam cross section which exits the multipole ion guide. The smaller the ion beam cross section which is transmitted through a multipole ion guide 165 and exit lens 162, the smaller the effective aperture size which is required in ion trap end plate 155.

The multipole ion guide 165 can efficiently transport ions through gradient in background gas pressure. As was shown in FIGS. 8a, b and c, the ion energy spread is reduced due to ion collisional cooling with the background gas. Higher trapping efficiency can be achieved with ions entering ion trap 154 when the ions have a narrow energy spread. Increased trapping efficiencies result in higher signal sensitivity for a given ion current entering trap 154. The ability to selectivity cutoff a range of m/z transmission through multipole ion guide 165 can also be used to increase sensitivity in ion trap mass spectrometers. Ion traps must first trap ions and then conduct a mass analysis on a packet of trapped ions. The trap can only hold a limited number of ions before it suffers from space charge effects which can shift measured m/z values and deteriorate resolution. For a given analysis, the multipole ion guide $a_n$ and $q_n$ value can be set to reduce the m/z range of ions which are transmitted to ion trap 154 through exit lens 162 and ion trap endplate 155. This extends the dynamic range signal response for the m/z values of interest by reducing the effects of space charging from m/z values which are not of interest for a given analysis. For example, the contamination 85, 86 and solvent related peaks 87, 88 observed in the spectrum of FIG. 5a would fill up the trap with charge and reduce the signal intensity range over which the Arginine peak 90 could be observed in the ion trap because the lower m/z peaks would be largely responsible for the space charge limits being reached in the ion trap. If the multipole ion guide $a_n$ and $q_n$ value were set for a low m/z cutoff as shown in the spectrum of FIG. 5b then the Arginine peak 91 would be the primary source of ions entering the trap and consequently the signal to noise observed would have a higher dynamic range before the effects of space charging would be observed. Increased dynamic range within a spectrum is important for trace analysis and analysis where accurate relative peak heights are needed to determine relative concentrations in solution.

FT-ICR mass spectrometers also trap ions and conduct mass analysis with packets of ions. Similar to ion traps, improvements in performance with an API/FT-ICR MS instrument can be achieved by using a multipole ion guide operated in vacuum pressure were ion kinetic energy cooling occurs reducing the ion energy spread for a given m/z. Effects due to space charge limits in the FT-ICR MS trapping cell can be reduced in a similar manner as described for ion traps above effectively increasing the dynamic range of the FT-ICR MS for m/z values of interest in a given analysis. The smaller effective inner diameter of these multipole ion guides produces a small ion beam cross section allowing a reduction in the aperture sizes leading to the FT-ICR mass analyzer without significantly reducing ion transmission through the smaller orifices.

Various configurations of hybrid API/mass spectrometers have been reported whose performance would be enhanced by the incorporation of a multipole ion guide in the vacuum ion transport region. Chien, Michael and Ludman (Anal. Chem., vol. 65, 1916–1924, 1993) have used an ion trap to trap ions entering from an API source and pulse them into a TOF mass spectrometer flight tube. A multipole ion guide could be effectively employed in the upstream vacuum stages to transmit ions from the higher pressure vacuum regions into the ion trap of this API/ion trap/TOF instrument.

Figure 13:
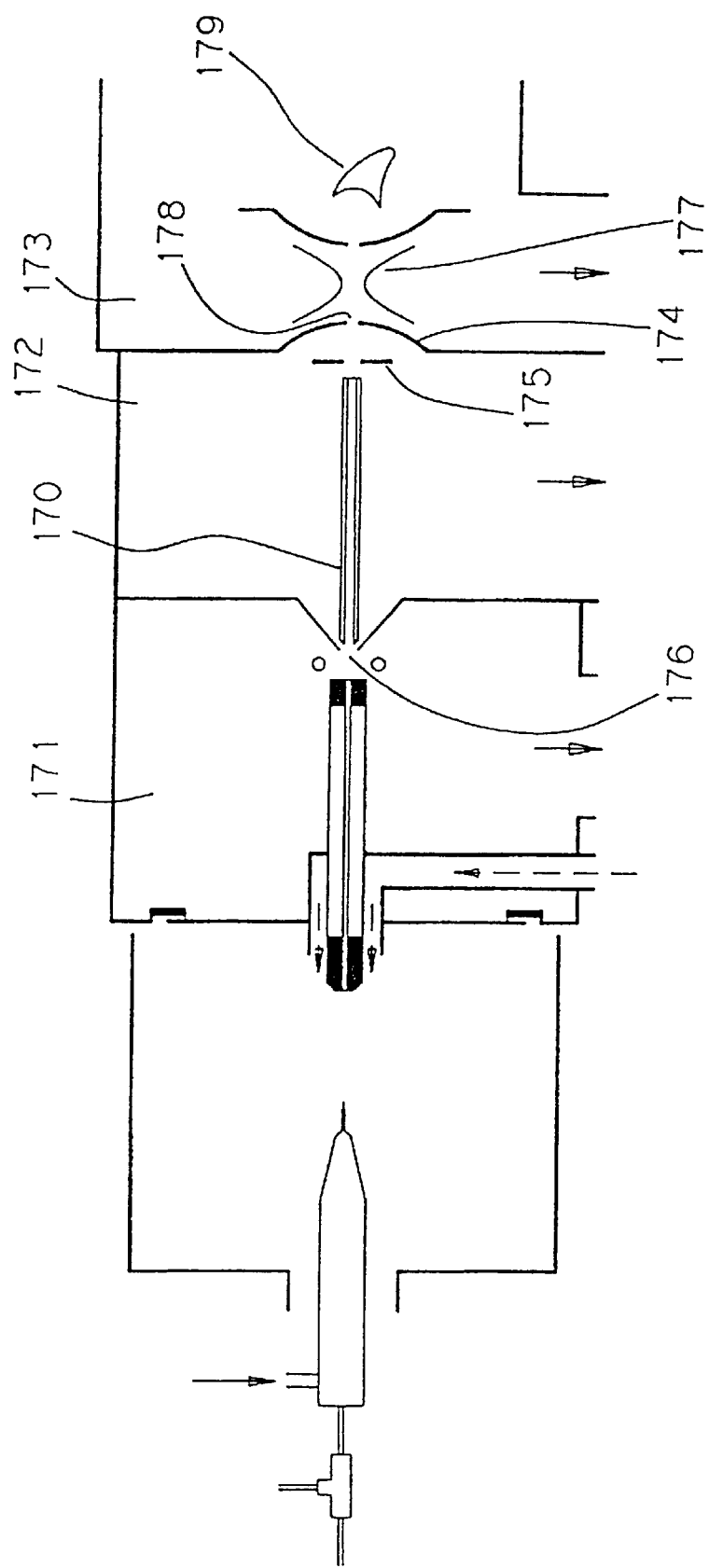
FIG. 13 is a diagram of a three vacuum pumping stage API/MS ion trap instrument with a single pumping stage multipole ion guide located in the second vacuum stage.
Figure 14:
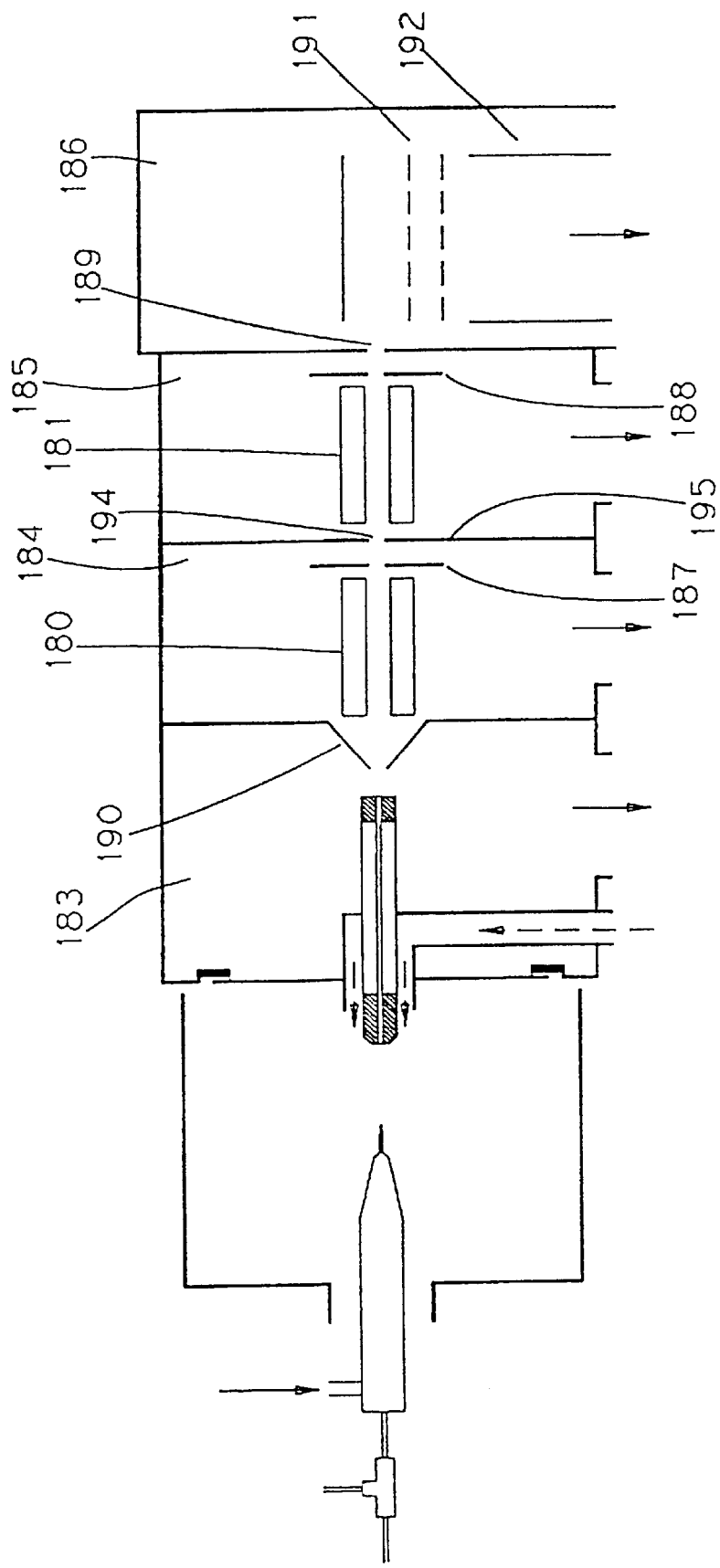
FIG. 14 is a diagram of a four vacuum pumping stage API/orthogonal pulsing TOF mass spectrometer instrument with single vacuum stage multipole ion guides located in the second and third vacuum stages.

Each mass spectrometer type has its own ion energy, entrance optics and vacuum requirements. The configuration of multipole ion guides, particularly those that extend through two or more vacuum pumping stages can be geometrically and operationally tailored to the instrument in which they are incorporated. However, single pumping stage multipole ion guides can be used effectively as well with less constraint imposed on the geometry of the ion guide to limit neutral gas conduction along its length. Two variations for configuring multipole ion guides in API/MS TOF and ion trap systems are shown in FIGS. 13 and 14. FIG. 13 is a diagram representation of a 3 vacuum stage API/ion trap mass spectrometer system where a multipole ion guide 170 is located in vacuum pumping stage 172. Ions passing from pumping stage 171 through skimmer orifice 176 are trapped from moving to far off axis in the radial direction and transmitted through ion guide 170. The ions exiting ion guide 170 are focused by exit lens 175 into ion trap 177 through endplate 174. The ion trap endplate aperture 178, also serves as the orifice into the third vacuum pumping stage 173. Ions can be injected into an ion trap through different gaps or apertures in the ion trap electrodes, however, this configuration is shown as one embodiment. The vacuum pressure in vacuum stage 172 and the multipole ion guide 170 length can be configured to cause sufficient ion collisional cooling with the background neutral gas resulting in a narrowing of ion energy spread for a given m/z. Use of a single pumping stage multipole ion guide may not allow the optimal tradeoffs in performance increase and vacuum pumping cost reduction as is possible with a continuous multiple pumping stage multipole ion guide but some performance advantages can be realized when compared to using a static voltage lens configuration.

Another variation with the use of multipole ion guides is the incorporation of two or more ion guides in consecutive vacuum pumping stages. This allows different $a_n$ and $q_n$ values to be set per ion guide but increases system complexity and cost. FIG. 14 is a diagram of a four vacuum stage API/TOF mass spectrometer system with single vacuum pumping stage multipole ion guides 180 and 181 located in pumping stages 184 and 185 respectively. Ions in vacuum stage 183 pass through skimmer 190 and enter ion guide 180. The ions which are transported through vacuum stage 184 by ion guide 180 are focused through the aperture 194 by multipole 180 exit lens 187. The ions then enter the a second ion guide 181 in vacuum stage 185 and are focused by lens 188 through aperture 189 as they exit the multipole ion guide 181. Ions passing though aperture 189 into vacuum stage 186 are pulsed orthogonally with lens set 191 into the TOF mass analyzer 192. The multipole ion guides can be operated with independent values of $a_n$ and $q_n$ may be set to optimize the TOF duty cycle and sensitivity. Similar to the continuous multiple pumping stage multipole ion guide configuration, the dual multipole ion guide configuration as diagrammed in FIG. 14 can be used reduce the ion energy spread and deliver low energy ions into the mass analyzer. However, with the dual multipole ion guide configuration, losses in ion transmission efficiency may occur in the region of static voltage lenses 187 and 195 between the two multipole assemblies 180 and 181.

We claim:

1. An apparatus used for analyzing chemical species comprising:
   a. an ion source operated at or near atmospheric pressure which produces ions from solution and delivers said ions into a first vacuum pumping stage through an orifice;
   b. two or more vacuum pumping stages with means for pumping away gas in each vacuum stage whereby each successive vacuum pumping stage has a lower background pressure than the previous pumping stage;
   c. a mass analyzer and detector located in one or more of the vacuum pumping stages;
   d. a multipole ion guide which begins in one vacuum pumping stage and extends contiguously into one or more subsequent vacuum pumping stages. Said multipole ion guide consisting of a multiple of equally spaced parallel poles extending the length of said ion guide. Said multipole ion guide is positioned in said vacuum pumping stages to guide ions delivered from said ion source through a portion of said vacuum stages;.
   e. a means for applying AC and DC voltages to said poles of said multipole ion guide.
   f. a means for controlling the AC frequency and said AC and DC voltages applied to said poles of said multipole ion guide;

2. An apparatus according to claim 1 where said ion source is an electrospray ion source.

3. An apparatus according to claim 1 where said ion source is an Atmospheric Pressure Chemical Ionization source.

4. An apparatus according to claim 1 where said ion source is an Inductively Coupled Plasma ion source.

5. An apparatus according to claim 1 where said multipole ion guide is a hexapole.

6. An apparatus according to claim 1 where said multipole ion guide is a quadrupole.

7. An apparatus according to claim 1 where said multipole ion guide has more than six poles.

8. An apparatus according to claim 1 where said mass analyzer is a quadrupole mass filter.

9. An apparatus according to claim 1 where said mass analyzer is a magnetic sector mass spectrometer.

10. An apparatus according to claim 1 where said mass analyzer is a Time-Of-Flight mass spectrometer.

11. An apparatus according to claim 1 where said mass analyzer is orthogonal pulsing Time-Of-Flight mass spectrometer.

12. An apparatus according to claim 1 where said mass analyzer is a hybrid ion trap Time-of Flight mass analyzer.

13. An apparatus according to claim 1 where said mass analyzer is an ion trap mass spectrometer.

14. An apparatus according to claim 1 where said mass analyzer is a Fourier Transform mass spectrometer.

15. An apparatus according to claim 1 which includes three of said vacuum pumping stages.

16. An apparatus according to claim 15 where said multipole ion guide begins in vacuum stage one and extends contiguously from said vacuum pumping stage two.

17. An apparatus according to claim 15 where said multipole ion guide begins in vacuum stage two and extends contiguously into said vacuum pumping stage three.

18. An apparatus according to claim 1 which includes four of said vacuum pumping stages.

19. An apparatus according to claim 1 which includes more than four of said vacuum pumping stages.

20. An apparatus according to claim 1 where said ion guide extends continuously from one vacuum pumping stage into the next of said vacuum pumping stages.

\* \* \* \* \*